United States Patent
Sudarsan et al.

(10) Patent No.: US 11,513,515 B2
(45) Date of Patent: Nov. 29, 2022

(54) UNMANNED VEHICLES AND ASSOCIATED HUB DEVICES

(71) Applicant: SparkCognition, Inc., Austin, TX (US)

(72) Inventors: Sridhar Sudarsan, Austin, TX (US); Syed Mohammad Ali, Leander, TX (US)

(73) Assignee: SPARKCOGNITION, INC., Austin, TX (US)

( * ) Notice: Subject to any disclaimer, the term of this patent is extended or adjusted under 35 U.S.C. 154(b) by 349 days.

(21) Appl. No.: 16/698,518

(22) Filed: Nov. 27, 2019

(65) Prior Publication Data

US 2020/0166928 A1    May 28, 2020

Related U.S. Application Data

(60) Provisional application No. 62/771,975, filed on Nov. 27, 2018.

(51) Int. Cl.
| | | |
|---|---|---|
| G05D 1/00 | (2006.01) | |
| B64C 39/02 | (2006.01) | |
| G05D 1/02 | (2020.01) | |
| H04W 4/021 | (2018.01) | |
| G06V 20/52 | (2022.01) | |

(52) U.S. Cl.
CPC .......... G05D 1/0027 (2013.01); B64C 39/024 (2013.01); G05D 1/0088 (2013.01); G05D 1/0225 (2013.01); G05D 1/0274 (2013.01); G06V 20/52 (2022.01); H04W 4/021 (2013.01); B64C 2201/127 (2013.01); G05D 2201/0209 (2013.01)

(58) Field of Classification Search
CPC .. G05D 1/0027; G05D 1/0088; G05D 1/0225; G05D 1/0274; G05D 2201/0209; B64C 39/024; B64C 2201/127; G06K 9/00771; H04W 4/021
See application file for complete search history.

(56) References Cited

U.S. PATENT DOCUMENTS

| | | | |
|---|---|---|---|
| 8,442,700 B2 * | 5/2013 | Anderson | G05D 1/0225 701/2 |
| 9,056,676 B1 * | 6/2015 | Wang | B60R 9/00 |
| 9,659,592 B2 * | 5/2017 | Ataka | G11B 5/85 |
| 9,718,564 B1 * | 8/2017 | Beckman | B61L 23/00 |
| 10,249,194 B2 * | 4/2019 | Erickson | G08G 1/0112 |
| 10,462,366 B1 * | 10/2019 | Bart | B64C 39/024 |
| 2012/0210853 A1 * | 8/2012 | Abershitz | F41H 11/00 89/1.11 |
| 2017/0161614 A1 * | 6/2017 | Mehta | G06N 20/00 |
| 2017/0225802 A1 * | 8/2017 | Lussier | E04H 12/18 |

(Continued)

FOREIGN PATENT DOCUMENTS

| | | | | |
|---|---|---|---|---|
| KR | 101594428 B1 | 2/2016 | | |
| WO | WO-2008147681 A2 * | 12/2008 | .......... | B64C 39/024 |
| WO | WO-2016022646 A1 * | 2/2016 | .......... | B64C 39/024 |

*Primary Examiner* — Calvin Cheung
(74) *Attorney, Agent, or Firm* — Moore IP Law

(57) ABSTRACT

A method includes receiving, at a mobile hub device, communications including location-specific risk data and a task assignment. The method also includes generating an output indicating dispatch coordinates. The dispatch coordinates identifying a dispatch location from which to dispatch, from the mobile hub device, one or more unmanned vehicles to perform a task of the task assignment.

20 Claims, 7 Drawing Sheets

(56) References Cited

U.S. PATENT DOCUMENTS

| | | | | |
|---|---|---|---|---|
| 2017/0323235 A1* | 11/2017 | Johnston | .................. | H04W 4/00 |
| 2018/0009549 A1* | 1/2018 | Sullivan | .................. | B64F 1/362 |
| 2018/0018602 A1* | 1/2018 | DiMaggio | ............... | G16H 40/20 |
| 2018/0107215 A1* | 4/2018 | Djuric | ...................... | G06N 3/04 |
| 2018/0218453 A1* | 8/2018 | Crabtree | ................ | G06N 5/022 |
| 2018/0233007 A1 | 8/2018 | Williams | | |
| 2018/0265295 A1* | 9/2018 | Beckman | ............... | B61D 17/16 |
| 2019/0043371 A1* | 2/2019 | Evan | ..................... | B64C 39/024 |
| 2019/0112046 A1* | 4/2019 | Lery | ...................... | B64D 47/08 |
| 2019/0166752 A1* | 6/2019 | Sidoti | .................. | G06V 20/188 |
| 2019/0176986 A1* | 6/2019 | Addonisio | ........... | G05D 1/0027 |
| 2019/0197442 A1* | 6/2019 | Lu | ....................... | G06Q 20/4016 |
| 2020/0003529 A1* | 1/2020 | Benezra | ................ | B64C 39/028 |
| 2020/0207273 A1* | 7/2020 | Zydek | .................... | B60D 1/245 |
| 2020/0242949 A1* | 7/2020 | Eyhorn | ................ | G08G 5/0039 |
| 2020/0346751 A1* | 11/2020 | Horelik | .................. | A61M 5/20 |

* cited by examiner

UNMANNED VEHICLES AND ASSOCIATED HUB DEVICES

CROSS-REFERENCE TO RELATED APPLICATION

The present application claims priority from U.S. Provisional Application No. 62/771,975 filed Nov. 27, 2018, entitled "UNMANNED VEHICLES AND ASSOCIATED HUB DEVICES," which is incorporated by reference herein in its entirety.

BACKGROUND

In some circumstances, human safety can be improved by using remotely controlled machine to perform a particular task. Examples of activities that can be performed more safely from a distance using a remotely controlled machine include some search and rescue actions (e.g., moving across or within shifting rubble). Additional examples include some policing actions and military activities. The capabilities of such remotely controlled machines have improved dramatically in recent years; however, the need to remotely control these machines means that operating expenses are relatively high because an expert operator (or team of expert operators) is usually required to use the remotely controlled machine effectively.

SUMMARY

The present disclosure describes systems and methods that enable use of unmanned systems to perform a variety of tasks without immediate human control (whether remote or local). Machine learning techniques are used to train various decision models that are executed by the unmanned systems to make autonomous or collaborative decisions. According to aspects of the present disclosure, an unmanned system or a group of unmanned systems can be provided a task assignment (such as an objective or goal), and the unmanned system(s) can determine one or more tasks to be performed to achieve the task assignment, determine and move to a location (or locations) from which to initiate the task(s), select a particular device (or particular devices) to perform the task(s), and initiate performance of the task(s) by instructing and deploying the selected device(s).

In some implementations, the task assignment can be generated by or derived from information provided by a human operator, and operations to accomplish the task assignment can be perform autonomously by the unmanned system(s).

DETAILED DESCRIPTION

Figure 1:
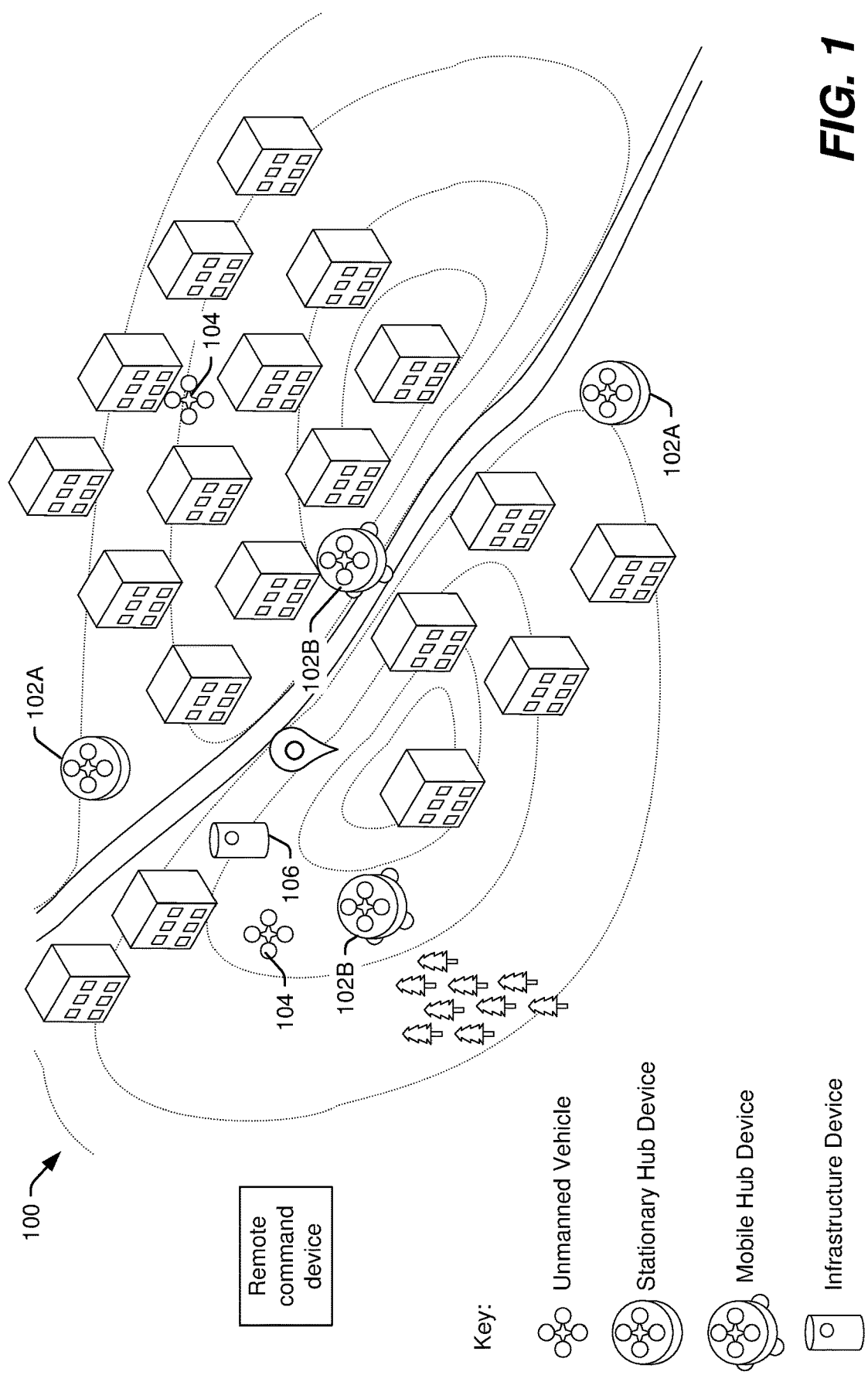
FIG. 1 illustrates a particular example of a geographic area and includes one or more hub devices and unmanned vehicles.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 illustrates a particular example of a geographic area and includes one or more hub devices 102 and unmanned vehicles of a system 100. The hub devices 102 include one more stationary hub devices 102A, one or more mobile hub devices 102B, or both. Each hub device 102 is configured to store, deploy, maintain, and/or control one or more unmanned vehicles 104. In this context, unmanned vehicle 104 is used as a generic term to include unmanned aerial vehicles, unmanned land vehicles, unmanned water vehicles, unmanned submersible vehicles, or combinations thereof. An unmanned vehicle 104 can be configured to gather data, to transport cargo, to manipulate objects in the environment, or combinations thereof, to perform a task.

In FIG. 1, the system 100 also includes one or more infrastructure devices 106. The infrastructure devices 106 can include sensors, communication equipment, data processing and/or storage equipment, other components, or a combination thereof. For example, a particular infrastructure device 106 can include a closed-circuit security camera that provides video of a portion of the geographic region. In this example, the video can be used by the system 100 to estimate the likelihood of occurrence of an event (e.g. a traffic delay, gathering of an unruly crowd, etc.) in the portion of the geographic region (or in a nearby portion of the geographic region) and can cause appropriate response actions to be taken by components of the system 100. To illustrate, if the system 100 determines that an unruly crowd has gathered in a particular zone of the geographic region monitored by the particular infrastructure device, and that the unruly crowd is moving toward an adjacent zone of the geographic region, the system 100 can cause a mobile hub device 102B that includes riot control unmanned vehicles 104 (i.e., unmanned vehicles 104 equipped to perform various riot control tasks) to be dispatched to the adjacent zone in preparation for possible deployment of the riot control unmanned vehicles 104.

In some implementations, each hub device 102 includes several different types of unmanned vehicles 104, and each unmanned vehicle 104 is associated with a set of capabilities. In such implementations, the hub device 102 can store inventory data indicating capabilities of each unmanned vehicle 104 in the hub device's inventory. To illustrate, in the previous example, the mobile hub device 102B deployed to the adjacent zone can include inventory data indicating that several of the unmanned vehicles 104 stored at the mobile hub device 102B are in a ready state (e.g., have sufficient fuel or a sufficient battery charge level, have no fault conditions that would limit or prevent operation, etc.), have equipment that would be helpful for riot control (e.g., a tear gas dispenser, a loud speaker, a wide angle camera, etc.), have movement capabilities (e.g., range, speed, off-road tires, maximum altitude) appropriate for use in the adjacent zone, etc. The mobile hub device 102B can also be dispatched to the adjacent zone based on a determination that the mobile hub device 102B itself (as distinct from the unmanned vehicles 104 of the mobile hub device 102B) is ready and able to operate in the adjacent zone. To illustrate, if the adjacent zone is flooded, the mobile hub device 102B can be capable of operating in the adjacent zone if it is water-resistant but may not be capable of operating in the adjacent zone if it is not water-resistant.

In addition to mobile hub device 102B, the system 100 can include one or more stationary hub devices 102A. The stationary hub devices 102A can include the same components and can operate in the same manner as mobile hub devices 102B, except that the stationary hub devices 102A maintain a fixed position unless relocated by a person or another device. In some implementations, stationary hub devices 102A can be used in portions of the geographic region with a relatively high response rate (e.g., in zones where the system 100 frequently performs tasks), in high risk areas (e.g., locations where a guard post might ordinarily be located, such as gates or doors to high security areas), in other locations, or in combinations thereof. In some implementations, a stationary hub device 102A can be positioned to facilitate operation of the mobile hub devices 120B. To illustrate, a stationary hub device 102A can be centrally located in the geographic region to act as a relay station or recharging/refueling station for unmanned vehicles 104 moving from one mobile hub device 102B to another mobile hub device 102B.

In some implementations, one or more of the infrastructure devices 106 are also stationary hub devices 102A. For example, a stationary hub device 102A can include sensors, communication equipment, data processing and/or storage equipment, other components, or a combination thereof.

In some implementations, the unmanned vehicles 104 can operate independently or as a group (e.g., a swarm). Further, at least some of the unmanned vehicles 104 are interchangeable among the hub devices 102. For example, an unmanned vehicle 104 can move from one hub device 102 to another hub device 102. To illustrate, if an unmanned vehicle 104 is assigned to perform a task and performance of the task will not allow the unmanned vehicle 104 to return to the hub device 102 that dispatched the unmanned vehicle 104, the unmanned vehicle 104 can dock at another hub device 102 to refuel or recharge, to re-equip (e.g., reload armaments), to download data, etc. In such implementations, the unmanned vehicle 104 can be added to the inventory of the hub device 102 at which it docked and can be removed from the inventory of the hub device 102 that deployed it. This capability enables the hub devices 102 to exchange unmanned vehicles 104 to accomplish particular objectives. To illustrate, unmanned vehicles 104 that are equipped with dangerous equipment, such as weapons systems, can be stored at a stationary hub device 102A and are only deployed to mobile hub devices 102B when needed or after discharge of the dangerous equipment (e.g., when armament has been expended). In this illustrative example, reinforced and secure systems to protect the dangerous equipment from unauthorized access can be heavy and expensive. Accordingly, it may be less expensive and more secure to store the dangerous equipment at the stationary hub device 102A than to attempt to ensure the security and tamper-resistance of a mobile hub device 102B.

In some implementations, a group of unmanned vehicles 104 can be controlled by a hub device 102. In other implementations, a group of unmanned vehicles 104 can be controlled by one unmanned vehicle 104 of the group as a coordination and control vehicle. The coordination and control vehicle can be dynamically selected or designated from among the group of unmanned vehicles 104 as needed. For example, a hub device 102 that is deploying the group of unmanned vehicles 104 can initially assign a first unmanned vehicle 104 as the coordination and control vehicle for the group based on the first unmanned vehicle 104 having an operating altitude that enables the first unmanned vehicle 104 to take up an overwatch position for the group. However, in this example, if the first unmanned vehicle 104 becomes incapacitated, is retasked, or is out of communications, another coordination and control vehicle is selected.

Designation of a coordination and control vehicle can be on a volunteer basis or by voting. To illustrate a volunteer example, when an unmanned vehicle 104 determines a coordination and control vehicle needs to be designated (e.g., because a heart-beat signal has not been received from the previous coordination and control vehicle within an expected time limit), the unmanned vehicle 104 can transmit a message to the group indicating that the unmanned vehicle 104 is taking over as the coordination and control vehicle. In an alternative volunteer example, the unmanned vehicle 104 that determines that a coordination and control vehicle needs to be designated can send a message to the group requesting that each member of the group send status information to the group, and an unmanned vehicle 104 that has the most appropriate status information among those reporting status information can take over as the coordination and control vehicle. To illustrate a voting example, when an unmanned vehicle 104 determines a coordination and control vehicle needs to be designated, the unmanned vehicle 104 can send a message to the group requesting that each member of the group send status information to the group, and the group can vote to designate the coordination and control vehicle based on reported status information.

Various machine learning techniques can be used to generate decision models used by the hub devices 102 to enable the hub devices 102 to autonomously or cooperatively identify task(s) to be performed, dispatch mobile hub devices 102B, dispatch unmanned vehicles 104, or combinations thereof. For example, one or more of the hub devices 102 can include one or more decision models, which can be trained machine learning models. In this example, a trained machine learning model can include a reinforcement learning model, a natural language processing model, a trained classifier, a regression model, etc. As a specific example, an unmanned vehicle 104 can be trained to perform a specific task, such as surveilling a crowd or deploying a weapon, by using reinforcement learning techniques. In this example, data can be gathered while an expert remote vehicle operator performs the specific task, and the data gathered while the expert performs the specific task can be used as a basis for training the unmanned vehicle to perform the specific task. As another example, video, audio, radio communications, or combinations thereof, from a monitored area can be used to train a risk assessment model to estimate the risk of particular types of events within a monitored area. As another example, task simulations can be used to train a mission planning model to make decisions about mission planning, can be used to train a cost-benefit model to make decisions related to equipment expenditures and equipment recovery, can be used to train a vehicle selection model to optimize selection of unmanned vehicles 104 assigned to particular task, etc.

Accordingly, devices (e.g., hub devices 102 and unmanned vehicles 104) of the system 100 are able to operate cooperatively or autonomously to perform one or more tasks. While a human can intervene, in some implementations, the system 100 can operate without human intervention. The system 100 may be especially beneficial for use in circumstances or locations in which human action would be difficult or dangerous. For example, in high risk crime areas, it can be expensive and risky to significantly increase police presence. The system 100 can be used in such areas to gather information, to provide initial risk assessments, to respond to risk or an event, etc. In the example of a high-risk crime area, one or more stationary hub devices 102A can be pre-positioned and one or more mobile hub devices 102B can be provided as backup to move into particular regions where response from the stationary hub devices 102A may be difficult.

Figure 2:
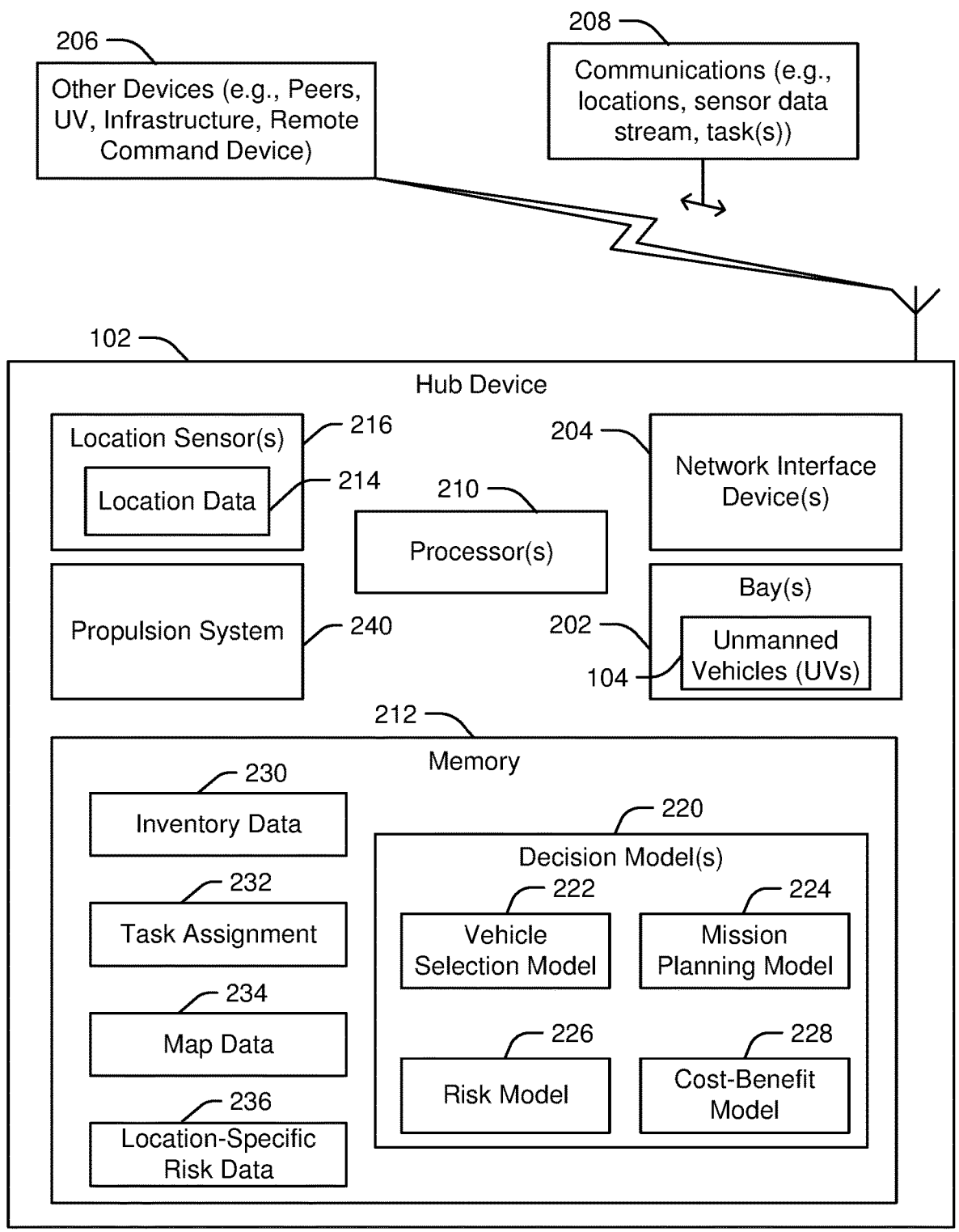
FIG. 2 is a block diagram of a particular example of a hub device.

FIG. 2 is a block diagram of a particular example of a hub device 102. The hub device 102 of FIG. 2 may be a stationary hub device 102A or a mobile hub device 102B of FIG. 1. The hub device 102 is configured to dispatch unmanned vehicles 104. For example, the hub device 102 includes one or more bays 202 for storage of a plurality of unmanned vehicles 104. In a particular implementation, each bay 202 is configured to store a single unmanned vehicle 104. In other implementations, a single bay 202 can store more than one unmanned vehicle 104. In some implementations, a bay 202 includes equipment and connections to refuel or recharge an unmanned vehicle 104, to reconfigure or re-equip (e.g., re-arm) the unmanned vehicle 104, to perform some types of maintenance on the unmanned vehicle 104, or combinations thereof. The bay(s) 202 can also be configured to shelter the unmanned vehicles 104 from environmental conditions and to secure the unmanned vehicles 104 to inhibit unauthorized access to the unmanned vehicles 104.

The hub device 102 also includes one or more network interface devices 204. The network interface device(s) 204 is configured communicate with other peer hub devices 206, to communicate 208 with the unmanned vehicles 104 of the hub device 102, to communicate 208 with unmanned vehicles 104 deployed by peer hub devices, to communicate with infrastructure devices 106, to communicate with a remote command device, or combinations thereof. The network interface device(s) 204 may be configured to use wired communications, wireless communications, or both. For example, the network interface device(s) 204 of a mobile hub device 102B can include one or more wireless transmitters, one or more wireless receivers, or a combination thereof (e.g., one or more wireless transceivers) to communicate with the other devices. As another example, the network interface device(s) 204 of a stationary hub device 102A can include a combination of wired and wireless devices, including one or more wireless transmitters, one or more wireless receivers, one or more wireless transceivers, one or more wired transmitters, one or more wired receivers, one or more wired transceivers, or combinations thereof, to communicate with the other devices. To illustrate, the stationary hub device 102A can communicate with other stationary devices (e.g., infrastructure devices 106) via wired connections and can communicate with mobile device (e.g., unmanned vehicles 104 and mobile hub devices 102B) via wireless connections. The network interface device(s) 204 can be used to communicate location data 214 (e.g., peer location data associated with one or more peer hub devices), sensor data (e.g., a sensor data stream, such as a video or audio stream), task data, commands to unmanned vehicles 104, etc.

The hub device 102 also includes a memory 212 and one or more processors 210. The memory 212 can include volatile memory devices, non-volatile memory devices, or both. The memory 212 stores data and instructions (e.g., computer code) that are executable by the processor(s) 210. For example, the instructions can include one or more decisions models 220 (e.g., trained machine learning models) that are executable by the processor(s) 210 to initiate, perform, or control various operations of the hub device 102. Examples of specific decision models that can be stored in the memory 212 and used to perform operations of the hub device 102 are described further below.

Examples of data that can be stored in the memory 212 include inventory data 230, map data 234, location-specific risk data 236, task assignment data 232, and location data 214. In FIG. 2, the location data 214 indicates the location of the hub device 102. For example, if the hub device 102 is a mobile hub device 102B, the location data 214 can be determined by one or more location sensors 216, such as a global positioning system receiver, a local positioning system sensor, a dead-reckoning sensor, etc. If the hub device 102 is a stationary hub device 102A, the location data 214 can be preprogrammed in the memory 212 or can be determined by one or more location sensors 216. The location data 214 can also include peer location data indicating the locations of peer devices (e.g., peer hub devices, infrastructure devices, unmanned vehicles, or a combination thereof). The locations of the peer devices can be received via the network interface device(s) 204 or, in the case of stationary peer devices 102A, can be preprogrammed in the memory 212.

The map data 234 represents a particular geographic region that includes a location of the hub device 102 and locations of the one or more peer hub devices. The map data 234 can also indicate features of the geographic region, such as locations and dimensions of buildings, roadway information, terrain descriptions, zone designations, etc. To illustrate, the geographic region can be logically divided into zones and the location of each zone can be indicated in the map data 234.

The inventory data 230 includes information identifying unmanned vehicles 104 stored in the bays 202 of the hub device 102. In some implementations, the inventory data 230 can also include information identifying unmanned vehicles 104 that were deployed by the hub device 102 and that have not been transferred to another peer hub device or lost. The inventory data 230 can also include information indicative of capabilities of each of the unmanned vehicles 104. Examples of information indicative of capabilities of an unmanned vehicle 104 include a load out of the unmanned vehicle 104, a health indicator of the unmanned vehicle 104, state of charge or fuel level of the unmanned vehicle 104, an equipment configuration of the unmanned vehicle 104, operational limits associated with the unmanned vehicle 104, etc. As another example, the information indicative of the capabilities of the unmanned vehicle 104 can include a readiness value. In this example, the processor(s) 210 can assign a readiness value (e.g., a numeric value, an alphanumeric value, or a logical value (e.g., a Boolean value)) to each unmanned vehicle 104 in the inventory data 230 and can use the readiness value to prioritize use and deployment of the unmanned vehicles 104 based on the readiness values. A readiness value can be assigned to a particular unmanned vehicle 104 based on, for example, a battery charge state of the particular unmanned vehicle 104, a fault status indicating in a vehicle health log of the particular unmanned vehicle 104, other status information associated with the particular unmanned vehicle 104, or a combination thereof.

The task assignment data 232 indicates a task assignment associated with the hub device 102 or with multiple hub devices 102. For example, a remote command device can send a task assignment to the hub device 102 or to multiple hub devices 102. The task assignment can specify one or more tasks (e.g., move an item from point A to point B) or can specify a goal or objective. In some implementations, the task assignment can include a natural language statement (e.g., an unstructured command), in which case the processor(s) can use a natural language processing model to evaluate the task assignment to identify the goal, objective, and/or task specified. If a goal or objective is specified, the processor(s) 210 can be used to execute one or more of the decision models 220 to evaluate the goal or objective and determine one or more tasks (e.g., specific operations or activities) to be performed to accomplish the goal or objective. To illustrate, if the objective is to monitor a zone for dangerous conditions, the processor(s) 210, executing the decision model 220, may determine that the objective can be accomplished by using a risk model 226 to evaluate video data documenting conditions over a significant percentage (e.g., 70%) of the zone and that three of the available unmanned vehicles can be deployed to specific locations to gather the video data.

The location-specific risk data 236 indicates historical or real-time risk values for particular types of events. The location-specific risk data 236 can be generated in advance, e.g., based on expert analysis of historical data, and stored in the memory 212 for use in risk analysis and cost-benefit analysis. Alternatively, the location-specific risk data 236 can be generated by a trained machine learning model, e.g., a location-specific risk model, in which case the location-specific risk data 236 can be based on an analysis of real-time or near real-time data.

As explained above, the decision models 220 on-board the hub device 102 can include one or more trained machine learning models that are trained to make particular decisions, to optimize particular parameters, to generate predictions or estimates, or combinations thereof. In the example illustrated in FIG. 2, the decision models 220 include a risk model 226 (e.g. the location-specific risk model), a vehicle selection model 222, a mission planning model 224, and a cost-benefit model 228. In other examples, the decision models 220 can include additional decision models, fewer decision models, or different decision models.

The vehicle selection model 222 is executable by the processor(s) 210 to evaluate the inventory data 230, task assignment data 232, the map data 234, and the location data 214, to assign one or more unmanned vehicles 104 of the plurality of unmanned vehicles 104 to perform a task of a task assignment. For example, the vehicle selection model 222 can select an unmanned vehicle 104 that has equipment capable of performing the task and that has sufficient fuel or battery charge, and that has particular other characteristics (e.g., flight range, off-road tires, etc.) to accomplish the task. In some implementations, the vehicle selection model 222 can also select the unmanned vehicle 104 based on other information, such as the peer location data. For example, a particular task may require flight with the wind (e.g., in a tail wind) to a particular location, where no available unmanned vehicle has sufficient power reserves to fly to the particular location and to subsequently return into the wind (e.g., in a head wind). In this example, the vehicle selection model 222 can select an unmanned vehicle 104 that is capable of flying to the particular location with the tail wind and subsequently to fly to the particular location of a peer device that is downwind from the particular location. After the vehicle selection model 222 selects the one or more unmanned vehicles 104 to perform the task, the hub device 102 assigns the one or more unmanned vehicles 104 to the task by storing information (e.g., in the inventory data 230) indicating that the one or more unmanned vehicles 104 are occupied, instructing the one or more unmanned vehicles 104, and deploying the one or more unmanned vehicles 104.

In some implementations, the vehicle selection model 222 selects a particular unmanned vehicle 104 based at least in part on a cost-benefit analysis by the cost-benefit model 228. The cost-benefit model 228 is configured to consider a priority assigned to the task (e.g., how important is successful accomplishment of this specific task to accomplishment of an overall goal or objective), a likelihood of the particular unmanned vehicle 104 accomplishing the task, and a likelihood of retrieval of the particular unmanned vehicle 104. For example, in a particular circumstance, the task is low priority (e.g., has an assigned priority value that is relatively low compared to other tasks the system 100 is performing) and the likelihood of retrieving the unmanned vehicle 104 after the task is performed is low. In this circumstance, the cost-benefit model 228 may suggest using a cheaper or less strategically important unmanned vehicle 104 that, due to its capabilities, is less likely to achieve the task than a more expensive or more strategically important unmanned vehicle 104. The cost-benefit model 228 can be tuned based on specific values or priorities of an organization operating the system 100.

In a particular implementation, the mission planning model 224 is configured to generate one or more task route plans. A task route plan indicates a particular end-to-end path that an unmanned vehicle 104 can follow during performance of a task. In some implementations, the task route plan is dynamic. For example, an unmanned vehicle 104 can initially (e.g. upon deployment) be given a task route path by a hub device 102, and the hub device 102 or the unmanned vehicle 104 can modify the task route plan based on intrinsic or extrinsic factors. Examples of such extrinsic factors include environmental conditions (e.g. weather), changing priorities, an updated risk assessment, updated task assignments, changed positions of other devices in the system 100, etc. Examples of such intrinsic factors include occurrence of fault conditions or equipment malfunctions. In some implementations, the mission planning model 224 can generate a plurality of task route plans, where each of the task route plans indicates a possible route that an unmanned vehicle 104 could follow to perform the task. In such implementations, the mission planning model 224 can also generate a set of estimated capabilities of the unmanned vehicle 104 to be able to perform the task, to be recoverable after performance of the task, or both. The mission planning model 224 can provide the set of estimated capabilities to the vehicle selection model 222, and the vehicle selection model 222 can select the one or more unmanned vehicles 104 to assign to a task based in part on the set of estimated capabilities.

In implementations in which the hub device 102 is a mobile hub device 102B, the hub device 102 also includes a propulsion system 240. The propulsion system 240 includes hardware to cause motion of the mobile hub device 102B via land, air, and/or water. The mobile hub device 102B can also include components and software to enable the mobile hub device 102B to determine its currently location and to select a new location (e.g., a dispatch location). For example, the mobile hub device 102B can include a decision model 220 that is executable by the processor(s) 210 to evaluate the task assignment data 232, the location-specific risk data 236, the map data 234, the location data 214, or a combination thereof, and to generate an output indicating dispatch coordinates. In this example, the dispatch coordinates identifying a dispatch location from which to dispatch one or more unmanned vehicles 104 of the plurality of unmanned vehicles to perform a task indicated by the task assignment.

In a particular implementation, the dispatch location is specified as a range, such as the dispatch coordinates and a threshold distance around the dispatch location or as a geofenced area. In response to determining that the current location of the mobile hub device 102B is not within the dispatch location (e.g., is further than the threshold distance from the dispatch coordinates), the processor(s) 210 control the propulsion system 240 based on the location data 214 and the map data 234 to move the mobile hub device 102B to the dispatch location (e.g., within a threshold distance of the dispatch coordinates). For example, the processor(s) can use the map data 234, the location data 214, and the dispatch coordinates, to determine a travel path to move the mobile hub device 102B to the dispatch location based on mobility characteristics of the mobile hub device 102B. To illustrate, if the mobile hub device 102B is capable of operating in water, the travel path can include a path across a lake or stream; however, if the mobile hub device 102B is not capable of operating in water, the travel path can avoid the lake or stream.

In some implementations, the threshold distance around the dispatch coordinates is determined based on an operational capability of the unmanned vehicles 104 and locations of other mobile hub devices 102B. For example, the dispatch coordinates can indicate an optimum or idealized location for dispatching the unmanned vehicles 104; however, for various reasons, the mobile hub device 102B may not be able to access or move to the dispatch coordinates. To illustrate, the dispatch coordinates can be in a lake and the mobile hub device 102B may be incapable of operating in water. As another illustrative example, a barrier, such as a fence, can be between the mobile hub device 102B and the dispatch coordinates. If other hub devices 102 are nearby and can receive the unmanned vehicle 104, the threshold distance can be set based on a maximum one-way range of the unmanned vehicle 104 minus a safety factor and a range adjustment associated with performing the task. If no other hub device is nearby that can receive the unmanned vehicle 104, the threshold distance can be set based on a maximum round trip range of the unmanned vehicle 104 minus a safety factor and a range adjustment associated with performing the task. The mobile hub device 102B can receive deployment location data associated with one or more other mobile hub devices 102B (or other peer devices) via the network interface device(s) 204 and determine the dispatch coordinates, the distance threshold, or both, based on the deployment location data.

In some implementations, the dispatch coordinates are determined responsive to a determination that the one or more unmanned vehicles 104 of the mobile hub device 102B are capable of performing the task. For example, the decision model 220 can compare the task to the inventory data 230 to determine whether any unmanned vehicle 104 onboard the mobile hub device 102B is capable of performing the task. If no unmanned vehicle 104 on-board the mobile hub device 102B is capable of performing the task, the decision model 220 can bypass or omit the process of determining the dispatch coordinates.

In some implementations, the mobile hub device 102B can be preemptively (or productively) deployed to a dispatch location based on a forecasted need. To illustrate, the risk model 226 can generate location-specific risk data 236 that indicates an estimated likelihood of a particular type of event occurring within a target geographic region. For example, the risk model 226 can evaluate real-time or near real-time status data for one or more zones within the particular geographic region and can generate the location-specific risk data 236 based on the real-time or near real-time status data. In this example, the location-specific risk data 236 can indicate a likelihood of a particular type of event (e.g., a wild fire, a riot, an intrusion) occurring within one or more zones of the plurality of zones.

Figure 3:
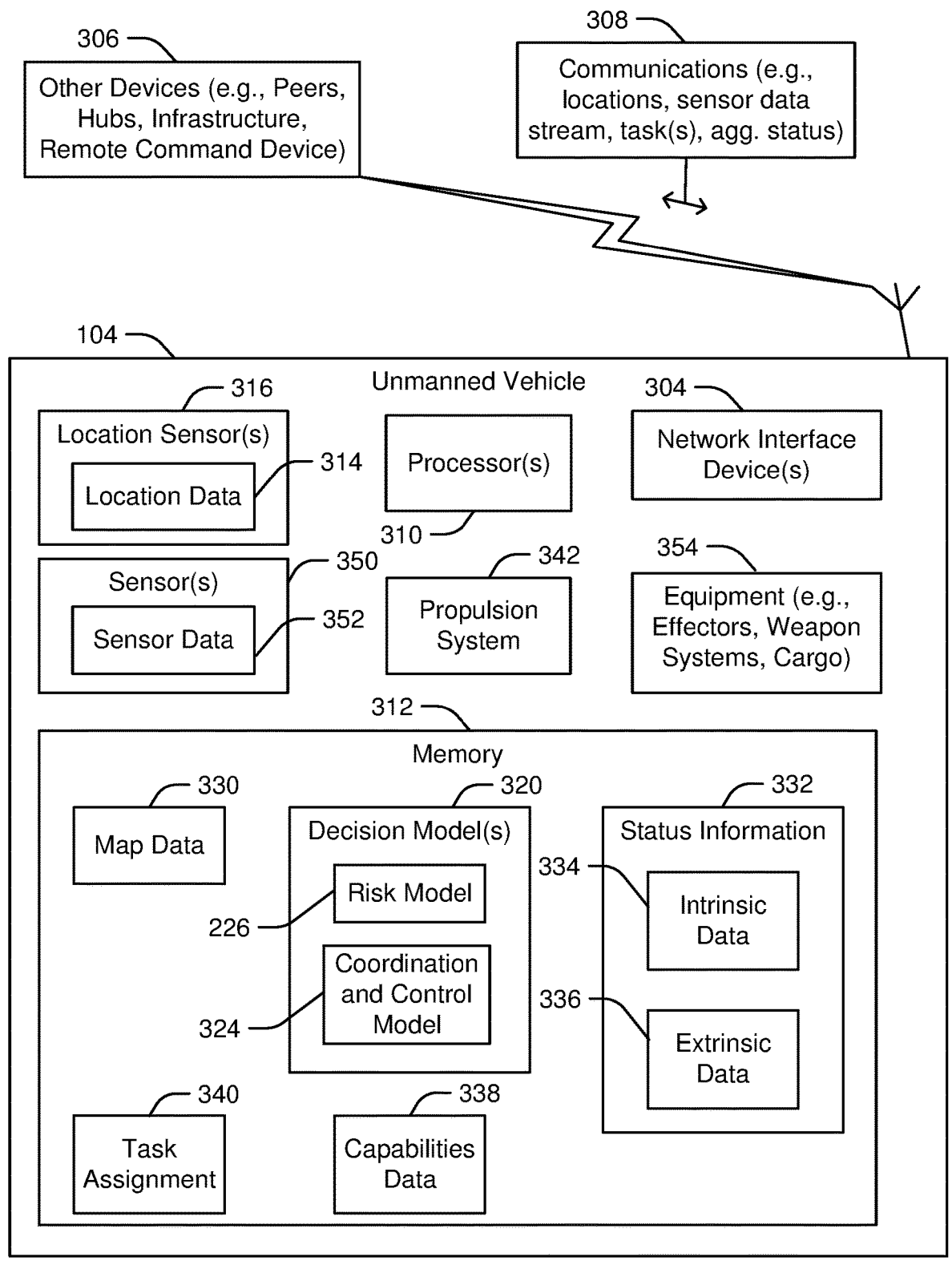
FIG. 3 is a block diagram of a particular example of an unmanned vehicle.

FIG. 3 is a block diagram of a particular example of an unmanned vehicle 104. The unmanned vehicle 104 includes or corresponds to an unmanned aerial vehicle (UAV), an unmanned combat aerial vehicle (UCAV), an unmanned ground vehicle (UGV), an unmanned water vehicle (UWV), or an unmanned hybrid vehicle (UHV) that can operate in more than one domain, such as in air and in water.

In some implementations, the unmanned vehicle 104 is configured to interact with a hub device 102. For example, the unmanned vehicle 104 may be configured to be storable in a bay 202 of a hub device 102 of FIG. 2. In such implementations, the unmanned vehicle 104 includes connections to refuel or recharge via the hub device 102, to be reconfigured or re-equipped (e.g., re-armed) via the hub device 102, to be maintained by the hub device 102, or combinations thereof.

The unmanned vehicle 104 includes one or more network interface devices 304, a memory 312, and one or more processors 310. The network interface device(s) 304 are configured communicate with hub devices 102, to communicate with peer unmanned vehicles 104, to communicate with infrastructure devices 106, to communicate with a remote command device, or combinations thereof. The network interface device(s) 304 are configured to use wired communications 308, wireless communications 308, or both. For example, the network interface device(s) 304 of an unmanned vehicle 104 can include one or more wireless transmitters, one or more wireless receivers, or a combination thereof (e.g., one or more wireless transceivers) to communicate with the other devices 306. As another example, the network interface device(s) 304 of the unmanned vehicle 104 can include a wired interface to connect to a hub device when the unmanned vehicle 104 is disposed within a bay 202 of the hub device 102.

The memory 312 can include volatile memory devices, non-volatile memory devices, or both. The memory 312 stores data and instructions (e.g., computer code) that are executable by the processor(s) 310. For example, the instructions can include one or more decisions models 320 (e.g., trained machine learning models) that are executable by the processor(s) 310 to initiate, perform, or control various operations of the unmanned vehicle 104. Examples of specific decision models 320 that can be stored in the memory 312 and used to perform operations of the unmanned vehicle 104 are described further below.

Examples of data that can be stored in the memory 312 include map data 330, task assignment data 340, intrinsic data 334, extrinsic data 336, and location data 314. In some implementations, some or all of the data associated with the hub device of FIG. 2, some or all of the decision models 320 associated with the hub device of FIG. 2, or combinations thereof, can be stored in the memory 312 of the unmanned vehicle 104 (or distributed across the memory 312 of several unmanned vehicles 104). For example, the memory 212 of the hub device 102 of FIG. 2 can be integrated with one or more of the unmanned vehicles 104 in the bays 202 of the hub device 102. In this example, the hub device 102 is a "dumb" device or a peer device to the unmanned vehicles 104 and the unmanned vehicles 104 control the hub device 102.

In FIG. 3, the location data 314 indicates the location of the unmanned vehicle 104. For example, the location data 314 can be determined by one or more location sensors 316, such as a global positioning system receiver, a local positioning system sensor, a dead-reckoning sensor, etc. The location data 314 can also include peer location data indicating the locations of peer devices (e.g., hub devices 102, infrastructure devices 106, other unmanned vehicles 104, or a combination thereof). The locations of the peer devices can be received via the network interface device(s) 304.

The unmanned vehicle 104 also includes one or more sensors 350 configured to generate sensor data 352. The sensors 350 can include cameras, ranging sensors (e.g., radar or lidar), acoustic sensors (e.g., microphones or hydrophones), other types of sensors, or any combination thereof. In some circumstances, the unmanned vehicle 104 can use the sensors 350 to perform a task. For example, the task can include capturing video data for a particular area, in which case a camera of the sensors 350 is primary equipment to achieve the task. In other circumstances, the sensors 350 can be secondary equipment that facilitates achieving the task. For example, the task can include dispensing tear gas within a region, in which case the sensors 350 may be used for aiming a tear gas dispenser to avoid bystanders.

The unmanned vehicle 104 can also include other equipment 354 to perform or assist with performance of a task. Examples of other equipment 354 can include effectors or manipulators (e.g., to pick up, move, or modify objects), weapons systems, cargo related devices (e.g., devices to acquire, retain, or release cargo), etc. In some implementations, equipment of the unmanned vehicle 104 can use consumables, such as ammunition, the availability of which can be monitored by the sensors 350.

The unmanned vehicle 104 also includes a propulsion system 342. The propulsion system 342 includes hardware to cause motion of the unmanned vehicle 104 via land, air, and/or water. The unmanned vehicle 104 can also include components and software to enable the unmanned vehicle 104 to determine its current location and to select and navigate to a target location.

In FIG. 3, the memory 312 of the unmanned vehicle 104 includes capabilities data 338 for the unmanned vehicle 104. The capabilities data 338 can be used by the decision models 320 on-board the unmanned vehicle 104 to make risk assessments, for mission planning, etc. In some implementations, the capabilities data 338 can be provided to other devices 306 of the system 100 as well. To illustrate, if the unmanned vehicle 104 of FIG. 3 is part of a swarm (e.g., a group of unmanned vehicles 104 that are coordinating to perform a task), the unmanned vehicle 104 can provide some or all of the capabilities data 338 to other vehicles of the swarm or to a coordination and control vehicle of the swarm. As another illustrative example, the unmanned vehicle 104 can provide some or all of the capabilities data 338 to a hub device 102, such as when the unmanned vehicle 104 is added to an inventory of the hub device 102.

The capabilities data 338 includes parameters, functions, or tables with data that is relevant to determining the ability of the unmanned vehicle 104 to perform particular tasks. Examples of capabilities data 338 that can be determined or known for each unmanned vehicle 104 include range, operational time, mode(s) of travel (e.g., air, land, or water), fuel or charging requirements, launch/recovery requirements, on-board decision models 320, communications characteristics, equipment load out (e.g., what equipment is on-board the unmanned vehicle 104), equipment compatibility (e.g., what additional equipment can be added to the unmanned vehicle 104 or what equipment interfaces are on-board the unmanned vehicle 104), other parameters, or combinations thereof. Some of the capabilities can be described as functions (or look-up tables) rather than single values. To illustrate, the range of the unmanned vehicle 104 can vary depending on the equipment on-board the unmanned vehicle 104, the state of charge or fuel level of the unmanned vehicle 104, and the environmental conditions (e.g., wind speed and direction) in which the unmanned vehicle 104 will operate. Thus, rather than having a single range value, the range of the unmanned vehicle 104 can be a function that accounts for equipment, state of charge/fuel level, environmental conditions, etc. to determine or estimate the range. Alternatively, a look-up table or set of look-up tables can be used to determine or estimate the range.

Some portions of the capabilities data 338 are static during operations of the unmanned vehicle 104. For example, the mode(s) of travel of the unmanned vehicle 104 can be static during normal operation of the unmanned vehicle 104 (although this capability can be updated based on reconfiguration of the unmanned vehicle 104). Other portions of the capabilities data 338 are updated or modified during normal operation of the unmanned vehicle 104. For example, the fuel level or charge state can be monitored and updated periodically or occasionally. In some implementations, the capabilities data 338 is updated based on or determined in part based on status information 332. The status information 332 can include intrinsic data 334 (i.e., information about the unmanned vehicle and its on-board equipment and components) and extrinsic data 336 (i.e., information about anything that is not a component of or on-board the unmanned vehicle 104). Examples of intrinsic data 334 include load out, health, charge, equipment configuration, etc. Examples of extrinsic data 336 include location, status of prior assigned tasks, ambient environmental conditions, etc. In some implementations, the value of a particular capabilities parameter can be determined by one of the decision models 320. For example, a trained machine learning model can be used to estimate the range or payload capacity of the unmanned vehicle 104 based on the intrinsic data 334 and the extrinsic data 336.

In a particular implementation, the unmanned vehicle 104 is configured to interact with other peer devices, such as other unmanned vehicles 104, hub devices 102, and/or infrastructure devices 106 as an autonomous swarm that includes a group of devices (e.g., a group of unmanned vehicles 104). In such implementations, when operating as a swarm, the group of devices can dynamically select a particular peer device as a lead device. To illustrate, if a group of unmanned vehicles 104 are dispatched to perform a task, the group of unmanned vehicles 104 can dynamically select one unmanned vehicle 104 of the group as a coordination and control vehicle. The decision models 320 can include a coordination and control model 324 that is executable by the processor 310 to perform the tasks associated with coordination and control of the group of devices (e.g., the swarm), to select a coordination and control device, or both.

Depending on the mission or the configuration of the system 100, the coordination and control device (e.g., a device executing the coordination and control model 324) can operate in either of two modes. In a first mode of operation, the coordination and control device acts solely in a coordination role. For example, the coordination and control device relays task data from remote devices (e.g., a remote command device) to peer devices of the group. As another example, the coordination and control device, operating in the coordination role, can receive status information 332 from peer devices of the group, generate aggregate status information for the group based on the status information 332, and transmit the aggregate status information 332 to a remote command device. When the coordination and control device is operating in the coordination role, the peer devices of the group can operate autonomously and cooperatively to perform a task. For example, a decision about sub-tasks to be performed by an unmanned vehicle 104 of the group can be determined independently by the unmanned vehicle 104 and can be communicated to the group, if coordination with the group is needed. As another example, such decisions can be determined in a distributed fashion by the group, e.g., using a voting process.

In a second mode of operation, the coordination and control device acts both in a coordination role and in a control role. The coordination role is the same as described above. In the control role, sub-tasks are assigned to members of the group by the coordination and control device. Thus, in the second mode of operation, the coordination and control device behaves like a local commander for the group in addition to relaying information to the remote command device and receive updated task assignments from the remote command device. In some implementations, the swarm can also operate when no communication is available with the remote command device. In such implementations, the coordination and control device can operate in the command mode or decisions can be made among the unmanned vehicles 104 individually or in a distributed manner, as describe above. In some implementations, regardless of the operating mode of the coordination and control vehicle, communications among the peer devices of a group can be sent via an ad hoc mesh network. In other implementations, the communications among the peer devices are sent via a structured network, such as hub-and-spoke network with the coordination and control device acting as the hub of the network.

Figure 4:
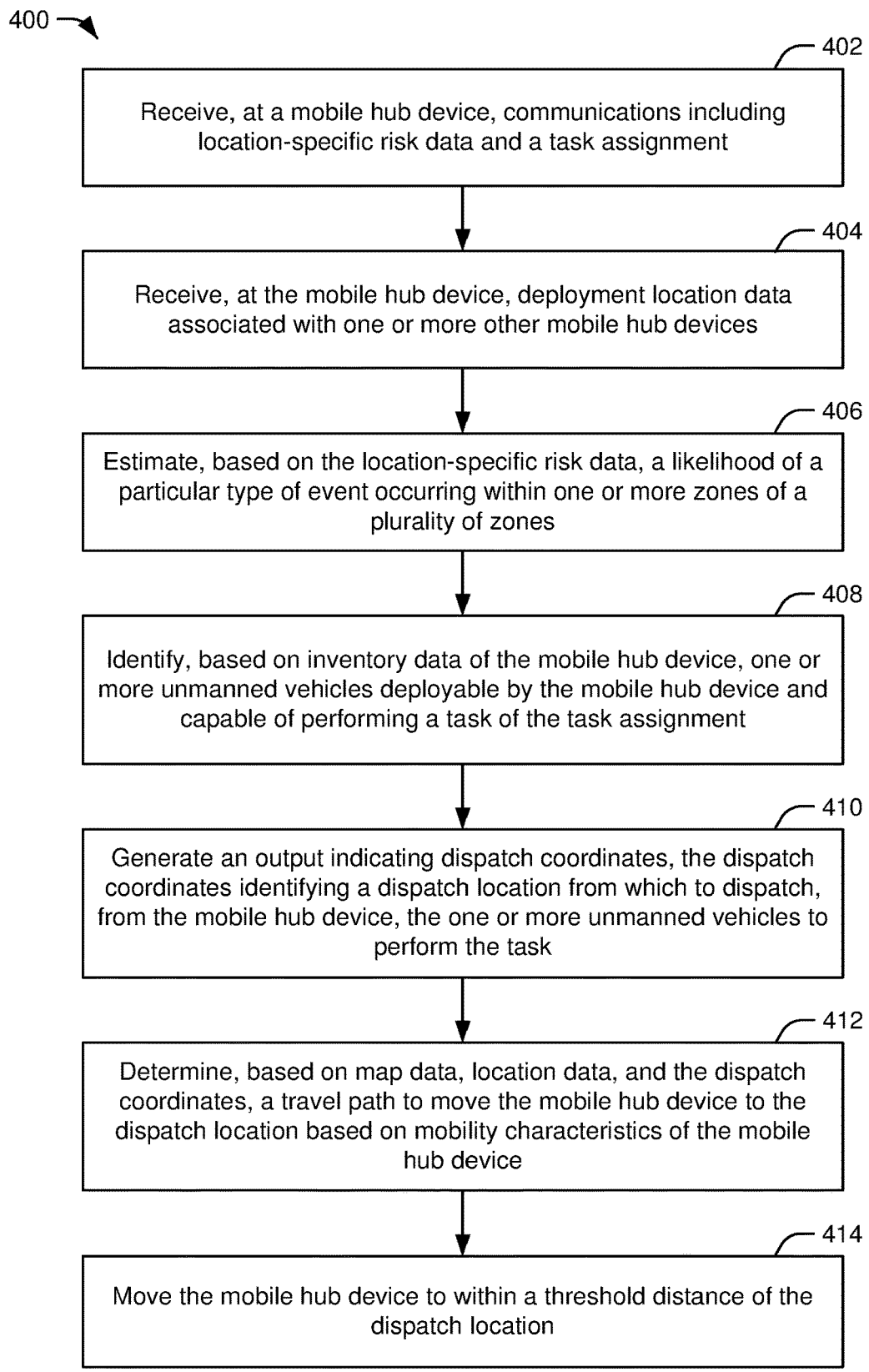
FIG. 4 is a flow chart of a particular example of a method performed by the hub device of FIG. 2.

FIG. 4 is a flow chart of a particular example of a method 400 performed by the hub device 102 of FIG. 2. In particular, the method 400 of FIG. 4 can be performed by a mobile hub device 102B. The method 400 of FIG. 4 enables a mobile hub device 102B to determine a location from which to dispatch unmanned vehicles 104 to perform a task. The method 400 can account for the current location of the mobile hub device 102B, locations of other hub devices 102, an inventory of unmanned vehicles 104 of the mobile hub device 102B, how the mobile hub device 102B moves, available travel paths from the current location of the mobile hub device 102B to a dispatch location, risk within various areas, specific tasks to be performed, other intrinsic or extrinsic information, or combinations thereof.

The method 400 includes receiving, at a mobile hub device 102B, communications including location-specific risk data and a task assignment, at 402. In some implementations, the method 400 can also include receiving, at the mobile hub device, deployment location data associated with one or more other mobile hub device, at 404.

In FIG. 4, the method 400 also includes estimating, based on the location-specific risk data, a likelihood of a particular type of event occurring within one or more zones of a plurality of zones, at 406. For example, a risk model 226 can be used to estimate the location-specific risk data 236. In some implementations, the method 400 also includes identifying, based on inventory data 230 of the mobile hub device 102B, one or more unmanned vehicles 104 that are deployable by the mobile hub device 102B and capable of performing a task of the task assignment data 232, at 408.

The method 400 includes generating an output indicating dispatch coordinates for the mobile hub device 102B, at 410. The dispatch coordinates identify a dispatch location from which to dispatch, from the mobile hub device 102B, one or more unmanned vehicles 104 to perform a task of the task assignment data 232. When the method 400 includes estimating the likelihood of the particular type of event occurring within the one or more zones, the dispatch coordinates can be determined based in part on the likelihood of the particular type of event occurring within the one or more zones. For example, the hub device 102 can evaluate data associated with multiple different zones in the geographic region and can determine to dispatch the unmanned vehicles 104 from a highest risk zone or from a safe zone that is near a high-risk zone. Additionally, or in the alternative, the dispatch coordinates can be determined in response to identifying the one or more unmanned vehicles 104 that are deployable and capable of performing a task of the task assignment data 232. For example, if the mobile hub device 102B determines that no unmanned vehicle 104 in its inventory is able to perform the task, the mobile hub device 102B can refrain from performing or omit operations to determine the dispatch coordinates.

The method 400 can also include determining, based on the map data 234, the location data 214, and the dispatch coordinates, a travel path to move the mobile hub device 102B to the dispatch location based on mobility characteristics of the mobile hub device 102B, at 412. The method 400 can also include moving the mobile hub device to within a threshold distance of the dispatch location 414.

Figure 5:
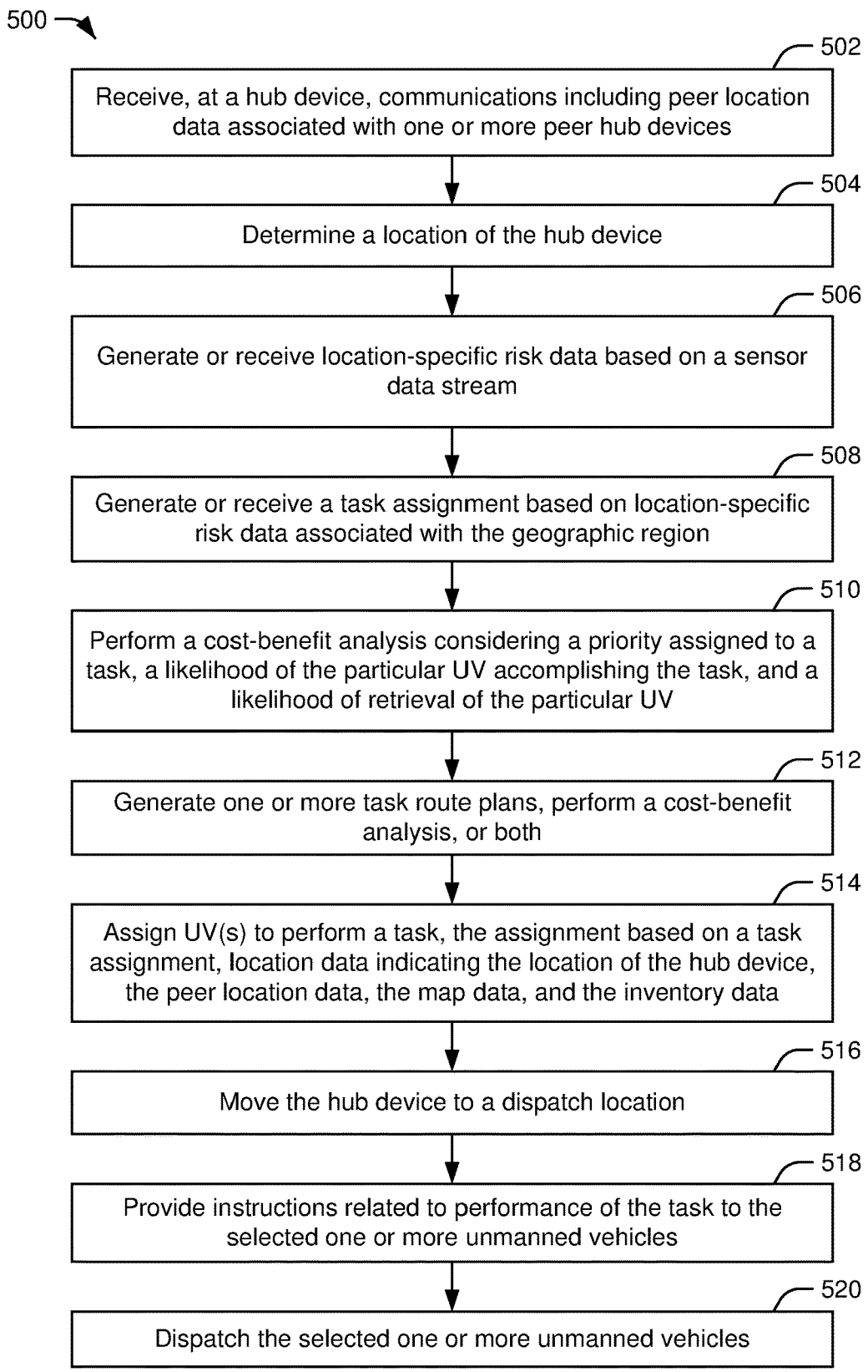
FIG. 5 is a flow chart of another particular example of a method performed by the hub device of FIG. 2.

FIG. 5 is a flow chart of another particular example of a method 500 performed by the hub device 102 of FIG. 2. The method 500 illustrated in FIG. 5 can be performed by a stationary hub device 102A or a mobile hub device 102B. The method 500 of FIG. 5 enables a hub device 102 to select and dispatch one or more unmanned vehicles 104 to perform one or more tasks. The method 500 can account for the current location of the hub device 102, locations of other hub devices 102, an inventory of unmanned vehicles 104 of the hub device 102, risk within various areas, specific tasks to be performed, cost and benefit of using particular unmanned vehicles 104 to perform a task, other intrinsic or extrinsic information, or combinations thereof. The method 500 also enables the hub device 102 to plan task routes for the unmanned vehicles 104, which can include handing recovery of an unmanned vehicle 104, hand off of the unmanned vehicle to another hub device 102, or even not recovering (e.g., abandoning) the unmanned vehicle 104. If an unmanned vehicle 104 is to be abandoned or left unrecovered for an extended period, the hub device 102 can instruct the unmanned vehicle 104 to enter a safe state upon completion of a task or when it becomes evident that the task cannot be completed. Entering the safe state can include, for example, deleting sensitive information, disabling or rendering inoperable certain systems (such as weapon systems), etc.

The method 500 of FIG. 5 includes receiving, at a hub device 102, communications including peer location data associated with one or more peer hub devices, 502. The method 500 can also include determining a location of the hub device 102, e.g., using a location sensor, at 504. Alternatively, if the hub device 102 is stationary, the location of the hub device 102 can be preprogrammed in a memory of the hub device 102.

The method 500 can include generating or receiving location-specific risk data 236, at 506. The location-specific risk data 236 can indicate a likelihood of a particular type of event occurring within a geographic region or a portion of the geographic region (e.g. a zone). The location-specific risk data 236 can be based on a sensor data stream, such as a video stream, an audio stream, or another real-time or near real-time sensor data stream. In a particular implementation, the hub device 102 generates the location-specific risk data 236 to estimate risks associated with a location in which the hub device 102 is situated.

The method 500 also includes generating or receiving a task assignment, at 508. The task assignment can be received from a remote command device, or the task assignment can be generated by the hub device 102. For example, the hub device 120 can generate the task assignment data 232 based, at least in part, on the location-specific risk data 236. As another example, the remote command device can generate the task assignment data 232 based on information or decision models 220 that are not available to the hub device 102 or based on human input.

In some implementations, the method 500 also includes generating one or more task route plans, at 512, performing a cost-benefit analysis, or both, at 510. The cost-benefit analysis can take into account a priority assigned to a task of the task assignment, a likelihood of a particular unmanned vehicle 104 accomplishing the task, a likelihood of retrieval of the particular unmanned vehicle 104, or a combination thereof. The task route plans can be generated based on capabilities of the unmanned vehicles 104 in inventor at the hub device 102.

The method 500 includes, at 514, assigning one or more unmanned vehicles 104 stored in one or more bays 202 of the hub device 102 to perform a task of the task assignment data 232. The assignment of the one or more unmanned vehicles 104 to perform the task can be based on, for example, the location data indicating the location of the hub device 102, the peer location data (e.g., location data 214), map data 234, and inventory data 230 identifying the one or more unmanned vehicles 104 and indicating capabilities of each of the one or more unmanned vehicles 104. In an implementation in which the method 500 includes generating one or more task route plans and performing a cost-benefit analysis, the assignment of the one or more unmanned vehicles 104 to perform the task can also be based on the task route plans and the cost-benefit analysis.

If the hub device 102 is a mobile hub device 102B, the method 500 can include determining a dispatch location from which to dispatch the one or more unmanned vehicles 104 and moving the mobile hub device 102B to the dispatch location, at 516.

The method 500 also includes, at 518, providing instructions related to performance of the task to the selected one or more unmanned vehicles and, at 520, dispatching the selected one or more unmanned vehicles.

Figure 6:
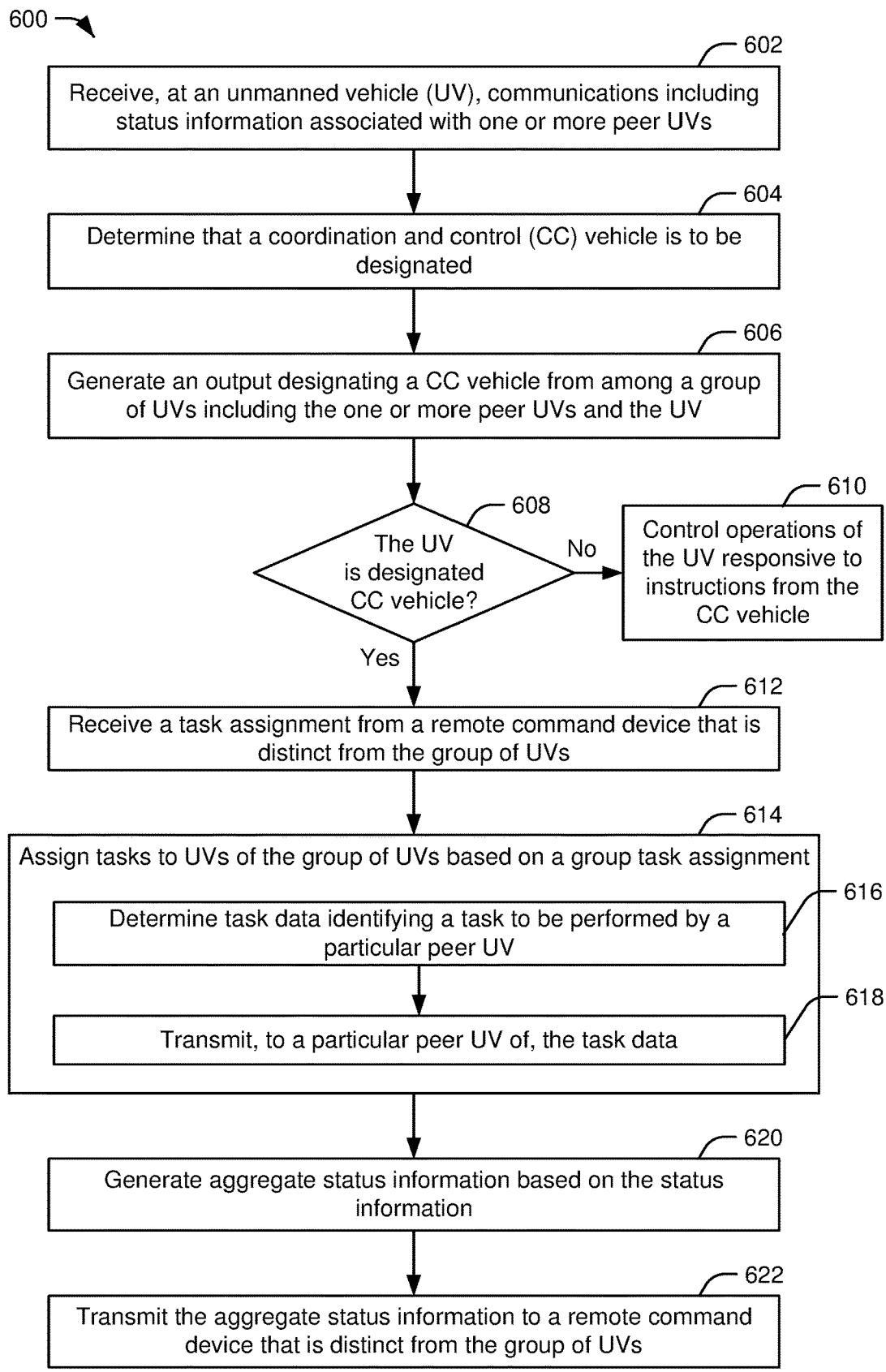
FIG. 6 is a flow chart of a particular example of a method performed by the unmanned vehicle of FIG. 3.

FIG. 6 is a flow chart of a particular example of a method 600 performed by the unmanned vehicle 104 of FIG. 3. The method 600 of FIG. 6 enables the unmanned vehicle 104 to interact with and cooperate with other unmanned vehicles 104 in a swarm. For example, the method 600 enables the unmanned vehicles 104 to dynamically select a lead vehicle, e.g., a coordination and control vehicle. The method 600 also enables the unmanned vehicle 104 to perform various operations associated with the coordination and control vehicle if the unmanned vehicle 104 is assigned that role.

The method 600 includes receiving, at the unmanned vehicle 104, communications including status information 332 associated with the one or more peer unmanned vehicles, at 602. In some implementations, the status information 332 can include a heart beat signal associated with a currently designated coordination and control vehicle. The status information 332 can also include, for example, location data 314, task status, capabilities 338, or other information about the other unmanned vehicles 104 of the group.

The method 600 also includes determining that a coordination and control vehicle for the group of unmanned vehicles is to be designated, at 604. In some circumstances, the unmanned vehicle 104 determines that a coordination and control vehicle for the group of unmanned vehicles is to be designated based on absence of the heart beat signal from a currently designated coordination and control vehicle. In some circumstances, another unmanned vehicle of the group can determine that the coordination and control vehicle for the group is to be designated, and can transmit a signal indicating that the coordination and control vehicle is to be designated. In this situation, determining that the coordination and control vehicle for the group is to be designated includes receiving (or receiving and confirming) the signal from the other unmanned vehicle.

The method 600 also includes generating an output designating the coordination and control vehicle, at 606. For example, the output can be a vote indicating that a particular peer device of the group should be assigned the coordination and control role, or the output can be a signal indicating that the unmanned vehicle has itself taken on the coordination and control role. If more than one unmanned vehicle 104 takes on the coordination and control role or if a vote is inconclusive, the unmanned vehicles 104 of the group can use an arbitration process to select the coordination and control vehicle.

If the unmanned vehicle 104 performing the method 600 of FIG. 6 is not designated the coordination and control vehicle, at 608, the unmanned vehicle 104 controls its operations responsive to instructions from the coordination and control vehicle, at 610. If the unmanned vehicle 104 performing the method 600 of FIG. 6 is designated the coordination and control vehicle, at 608, the method 600 includes performing various operations of the coordination and control vehicle.

For example, in the control mode of operations, the method 600 includes receiving a task assignment from a remote command device that is distinct from the group of unmanned vehicles, at 612, and assigning tasks to unmanned vehicles of the group of unmanned vehicles based on a group task assignment, at 614. Assigning tasks to unmanned vehicles can include, for example, determining task data identifying a task to be performed by a particular peer unmanned vehicle (e.g., based on risks, cost-benefit analysis, capabilities of the unmanned vehicles, etc.), at 616, and transmitting the task data to the particular peer unmanned vehicle, at 618. In the coordination mode of operations, the method includes generating aggregate status information based on the status information, at 620, and transmitting the aggregate status information to the remote command device, at 622.

Figure 7:
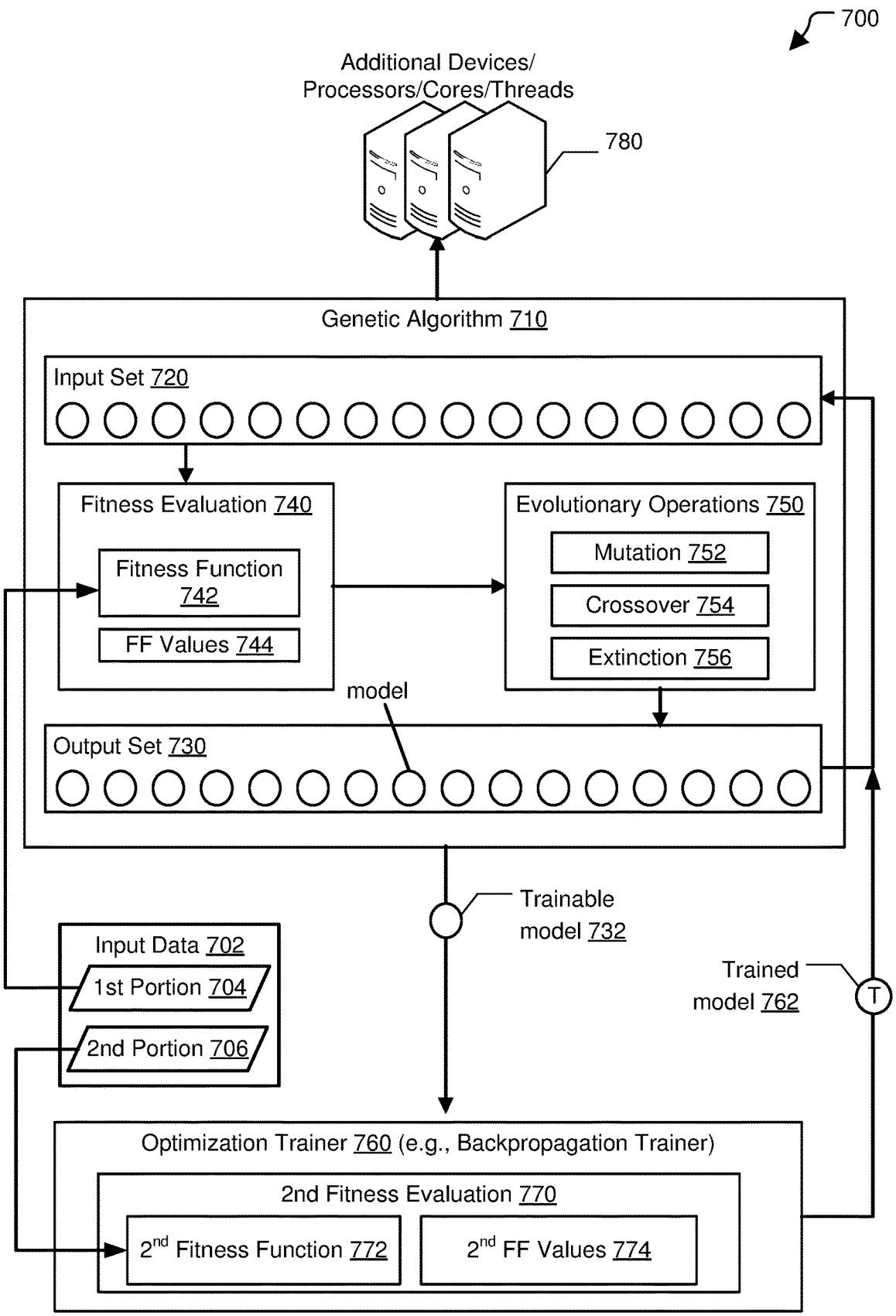
FIG. 7 is a diagram illustrating a system of generating and training a machine learning data model that can be used by one or more of the hub devices or unmanned vehicles of FIG. 1

Referring to FIG. 7, a particular illustrative example of a system 700 for generating a machine learning data model that can be used by one or more of the hub devices or unmanned vehicles of FIG. 1 is shown. The system 700, or portions thereof, may be implemented using (e.g., executed by) one or more computing devices, such as laptop computers, desktop computers, mobile devices, servers, and Internet of Things devices and other devices utilizing embedded processors and firmware or operating systems, etc.

In the illustrated example, the system 700 includes a genetic algorithm 710 and an optimization trainer 760. The optimization trainer 760 is, for example, a backpropagation trainer, a derivative free optimizer (DFO), an extreme learning machine (ELM), etc. In particular implementations, the genetic algorithm 710 is executed on a different device, processor (e.g., central processor unit (CPU), graphics processing unit (GPU) or other type of processor), processor core, and/or thread (e.g., hardware or software thread) than the optimization trainer 760. The genetic algorithm 710 and the optimization trainer 760 are executed cooperatively to automatically generate a machine learning data model (e.g., one of the decision models 220 and/or 320 of FIGS. 2 and 3 and referred to herein as "models" for ease of reference), such as a neural network or an autoencoder, based on the input data 702. The system 700 performs an automated model building process that enables users, including inexperienced users, to quickly and easily build highly accurate models based on a specified data set.

During configuration of the system 700, a user specifies the input data 702. In some implementations, the user can also specify one or more characteristics of models that can be generated. In such implementations, the system 700 constrains models processed by the genetic algorithm 710 to those that have the one or more specified characteristics. For example, the specified characteristics can constrain allowed model topologies (e.g., to include no more than a specified number of input nodes or output nodes, no more than a specified number of hidden layers, no recurrent loops, etc.). Constraining the characteristics of the models can reduce the computing resources (e.g., time, memory, processor cycles, etc.) needed to converge to a final model, can reduce the computing resources needed to use the model (e.g., by simplifying the model), or both.

The user can configure aspects of the genetic algorithm 710 via input to graphical user interfaces (GUIs). For example, the user may provide input to limit a number of epochs that will be executed by the genetic algorithm 710. Alternatively, the user may specify a time limit indicating an amount of time that the genetic algorithm 710 has to execute before outputting a final output model, and the genetic algorithm 710 may determine a number of epochs that will be executed based on the specified time limit. To illustrate, an initial epoch of the genetic algorithm 710 may be timed (e.g., using a hardware or software timer at the computing device executing the genetic algorithm 710), and a total number of epochs that are to be executed within the specified time limit may be determined accordingly. As another example, the user may constrain a number of models evaluated in each epoch, for example by constraining the size of an input set 720 of models and/or an output set 730 of models.

The genetic algorithm 710 represents a recursive search process. Consequently, each iteration of the search process (also called an epoch or generation of the genetic algorithm 710) has an input set 720 of models (also referred to herein as an input population) and an output set 730 of models (also referred to herein as an output population). The input set 720 and the output set 730 may each include a plurality of models, where each model includes data representative of a machine learning data model. For example, each model may specify a neural network or an autoencoder by at least an architecture, a series of activation functions, and connection weights. The architecture (also referred to herein as a topology) of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tan h activation function. In such implementations, the hyperparameters of a layer include layer type, node count, activation function, and aggregation function. Further, a complete autoencoder is specified by specifying an order of layers and the hyperparameters of each layer of the autoencoder.

In a particular aspect, the genetic algorithm 710 may be configured to perform speciation. For example, the genetic algorithm 710 may be configured to cluster the models of the input set 720 into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm 710 may be configured to serialize a model into a bit string. In this example, the genetic distance between models may be represented by the number of differing bits in the bit strings corresponding to the models. The bit strings corresponding to models may be referred to as "encodings" of the models.

After configuration, the genetic algorithm 710 may begin execution based on the input data 702. Parameters of the genetic algorithm 710 may include but are not limited to, mutation parameter(s), a maximum number of epochs the genetic algorithm 710 will be executed, a termination condition (e.g., a threshold fitness value that results in termination of the genetic algorithm 710 even if the maximum number of generations has not been reached), whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 710 uses a single mutation parameter or set of mutation parameters for all of the models. In such examples, the mutation parameter may impact how often, how much, and/or what types of mutations can happen to any model of the genetic algorithm 710. In alternative examples, the genetic algorithm 710 maintains multiple mutation parameters or sets of mutation parameters, such as for individual or groups of models or species. In particular aspects, the mutation parameter(s) affect crossover and/or mutation operations, which are further described below.

For an initial epoch of the genetic algorithm 710, the topologies of the models in the input set 720 may be randomly or pseudo-randomly generated within constraints specified by the configuration settings or by one or more architectural parameters. Accordingly, the input set 720 may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers; whereas, the second model can include one or more recurrent layers.

The genetic algorithm 710 may automatically assign an activation function, an aggregation function, a bias, connection weights, etc. to each model of the input set 720 for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set 720 of the initial epoch. Thus, the models of the input set 720 of the initial epoch may have different topologies (which may include different input nodes corresponding to different input data fields if the data set includes many data fields) and different connection weights. Further, the models of the input set 720 of the initial epoch may include nodes having different activation functions, aggregation functions, and/or bias values/functions.

During execution, the genetic algorithm 710 performs fitness evaluation 740 and evolutionary operations 750 on the input set 720. In this context, fitness evaluation 740 includes evaluating each model of the input set 720 using a fitness function 742 to determine a fitness function value 744

("FF values" in FIG. 7) for each model of the input set 720. The fitness function values 744 are used to select one or more models of the input set 720 to modify using one or more of the evolutionary operations 750. In FIG. 7, the evolutionary operations 750 include mutation operations 752, crossover operations 754, and extinction operations 756, each of which is described further below.

During the fitness evaluation 740, each model of the input set 720 is tested based on the input data 702 to determine a corresponding fitness function value 744. For example, a first portion 704 of the input data 702 may be provided as input data to each model, which processes the input data (according to the network topology, connection weights, activation function, etc., of the respective model) to generate output data. The output data of each model is evaluated using the fitness function 742 and the first portion 704 of the input data 702 to determine how well the model modeled the input data 702. In some examples, fitness of a model is based on reliability of the model, performance of the model, complexity (or sparsity) of the model, size of the latent space, or a combination thereof.

In a particular aspect, fitness evaluation 740 of the models of the input set 720 is performed in parallel. To illustrate, the system 700 may include devices, processors, cores, and/or threads 780 in addition to those that execute the genetic algorithm 710 and the optimization trainer 760. These additional devices, processors, cores, and/or threads 780 can perform the fitness evaluation 740 of the models of the input set 720 in parallel based on a first portion 704 of the input data 702 and may provide the resulting fitness function values 744 to the genetic algorithm 710.

The mutation operation 752 and the crossover operation 754 are highly stochastic under certain constraints and a defined set of probabilities optimized for model building, which produces reproduction operations that can be used to generate the output set 730, or at least a portion thereof, from the input set 720. In a particular implementation, the genetic algorithm 710 utilizes intra-species reproduction (as opposed to inter-species reproduction) in generating the output set 730. In other implementations, inter-species reproduction may be used in addition to or instead of intra-species reproduction to generate the output set 730. Generally, the mutation operation 752 and the crossover operation 754 are selectively performed on models that are more fit (e.g., have higher fitness function values 744, fitness function values 744 that have changed significantly between two or more epochs, or both).

The extinction operation 756 uses a stagnation criterion to determine when a species should be omitted from a population used as the input set 720 for a subsequent epoch of the genetic algorithm 710. Generally, the extinction operation 756 is selectively performed on models that are satisfy a stagnation criteria, such as modes that have low fitness function values 744, fitness function values 744 that have changed little over several epochs, or both.

In accordance with the present disclosure, cooperative execution of the genetic algorithm 710 and the optimization trainer 760 is used arrive at a solution faster than would occur by using a genetic algorithm 710 alone or an optimization trainer 760 alone. Additionally, in some implementations, the genetic algorithm 710 and the optimization trainer 760 evaluate fitness using different data sets, with different measures of fitness, or both, which can improve fidelity of operation of the final model. To facilitate cooperative execution, a model (referred to herein as a trainable model 732 in FIG. 7) is occasionally sent from the genetic algorithm 710 to the optimization trainer 760 for training. In a particular implementation, the trainable model 732 is based on crossing over and/or mutating the fittest models (based on the fitness evaluation 740) of the input set 720. In such implementations, the trainable model 732 is not merely a selected model of the input set 720; rather, the trainable model 732 represents a potential advancement with respect to the fittest models of the input set 720.

The optimization trainer 760 uses a second portion 706 of the input data 702 to train the connection weights and biases of the trainable model 732, thereby generating a trained model 762. The optimization trainer 760 does not modify the architecture of the trainable model 732.

During optimization, the optimization trainer 760 provides a second portion 706 of the input data 702 to the trainable model 732 to generate output data. The optimization trainer 760 performs a second fitness evaluation 770 by comparing the data input to the trainable model 732 to the output data from the trainable model 732 to determine a second fitness function value 774 based on a second fitness function 772. The second fitness function 772 is the same as the first fitness function 742 in some implementations and is different from the first fitness function 742 in other implementations. In some implementations, the optimization trainer 760 or portions thereof is executed on a different device, processor, core, and/or thread than the genetic algorithm 710. In such implementations, the genetic algorithm 710 can continue executing additional epoch(s) while the connection weights of the trainable model 732 are being trained by the optimization trainer 760. When training is complete, the trained model 762 is input back into (a subsequent epoch of) the genetic algorithm 710, so that the positively reinforced "genetic traits" of the trained model 762 are available to be inherited by other models in the genetic algorithm 710.

In implementations in which the genetic algorithm 710 employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 710 may maintain a data structure that tracks the fitness of each species across multiple epochs. Based on the species fitness, the genetic algorithm 710 may identify the "fittest" species, which may also be referred to as "elite species." Different numbers of elite species may be identified in different embodiments.

In a particular aspect, the genetic algorithm 710 uses species fitness to determine if a species has become stagnant and is therefore to become extinct. As an illustrative non-limiting example, the stagnation criterion of the extinction operation 756 may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm 710.

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 730 of the epoch is generated based on the input set 720 and the evolutionary operation 750. In the illustrated example, the output set 730 includes the same number of models as the input set 720. In some implementations, the output set 730 includes each of the "overall elite" models and each of the "elite member" models. Propagating the "overall elite" and "elite member" models to the next epoch may preserve the "genetic traits" resulted in caused such models being assigned high fitness values.

The rest of the output set 730 may be filled out by random reproduction using the crossover operation 754 and/or the mutation operation 752. After the output set 730 is generated, the output set 730 may be provided as the input set 720 for the next epoch of the genetic algorithm 710.

After one or more epochs of the genetic algorithm 710 and one or more rounds of optimization by the optimization trainer 760, the system 700 selects a particular model or a set of model as the final model (e.g., a model that is executable to perform one or more of the model-based operations of FIGS. 1-6). For example, the final model may be selected based on the fitness function values 744, 774. For example, a model or set of models having the highest fitness function value 744 or 774 may be selected as the final model. When multiple models are selected (e.g., an entire species is selected), an ensembler can be generated (e.g., based on heuristic rules or using the genetic algorithm 710) to aggregate the multiple models. In some implementations, the final model can be provided to the optimization trainer 760 for one or more rounds of optimization after the final model is selected. Subsequently, the final model can be output for use with respect to other data (e.g., real-time data).

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Particular aspects of the disclosure are described below in the following clauses:

According to a clause 1, a mobile hub device for dispatch of unmanned vehicles includes a location sensor to generate location data indicating a location of the mobile hub device, one or more bays for storage of a plurality of unmanned vehicles, one or more network interface devices configured to receive communications including location-specific risk data and a task assignment, a memory storing a decision model and map data, the map data representing a particular geographic region that includes the location of the mobile hub device, and a processor configured to execute the decision model based on the task assignment, the location-specific risk data, the map data, and the location data and to generate an output indicating dispatch coordinates, the dispatch coordinates identifying a dispatch location from which to dispatch one or more unmanned vehicles of the plurality of unmanned vehicles to perform a task indicated by the task assignment.

Clause 2 includes the mobile hub device of clause 1, wherein the memory is integrated into one or more unmanned vehicles of the plurality of unmanned vehicles.

Clause 3 includes the mobile hub device of clause 1 or clause 2, wherein the plurality of unmanned vehicles include an unmanned aerial vehicle (UAV), an unmanned combat aerial vehicle (UCAV), an unmanned ground vehicle (UGV), an unmanned water vehicle (UWV), an unmanned hybrid vehicle (UHV), or combinations thereof.

Clause 4 includes the mobile hub device of any of clauses 1 to 3, further comprising a propulsion system responsive to the processor, the propulsion system configured to move the mobile hub device to within a threshold distance of the dispatch location.

Clause 5 includes the mobile hub device of clause 4, wherein the threshold distance is determined based on an operational capability of the one or more unmanned vehicles and locations of other mobile hub devices.

Clause 6 includes the mobile hub device of any of clauses 1 to 5, wherein the processor is further configured to determine, based on the map data, the location data, and the dispatch coordinates, a travel path to move the mobile hub device to the dispatch location based on mobility characteristics of the mobile hub device.

Clause 7 includes the mobile hub device of any of clauses 1 to 6, wherein the location-specific risk data indicates an estimated likelihood of a particular type of event occurring within a target geographic region.

Clause 8 includes the mobile hub device of any of clauses 1 to 7, wherein the processor is configured to determine the dispatch coordinates in response to determine that the one or more unmanned vehicles are in capable of performing the task.

Clause 9 includes the mobile hub device of any of clauses 1 to 8, wherein the memory further stores inventory data indicating an equipment configuration of each of the plurality of unmanned vehicles, wherein the processor is further configured to select the one or more unmanned vehicles to dispatch at the dispatch location based on the task assignment and the inventory data.

Clause 10 includes the mobile hub device of any of clauses 1 to 9, wherein the location-specific risk data includes real-time or near real-time status data for each of a plurality of zones within the particular geographic region, the memory further storing a risk model that is executable by the processor to estimate, based on the location-specific risk data, a likelihood of a particular type of event occurring within one or more zones of the plurality of zones.

Clause 11 includes the mobile hub device of clause 10, wherein the risk model includes a trained machine learning model.

Clause 12 includes the mobile hub device of any of clauses 1 to 11, wherein the decision model includes a trained machine learning model.

Clause 13 includes the mobile hub device of any of clauses 1 to 12, wherein the one or more network interface devices are further configured to receive deployment location data associated with one or more other mobile hub devices, and the processor is configured to determine the dispatch coordinates further based on the deployment location data.

According to clause 14 a method includes receiving, at a mobile hub device, communications including location-specific risk data and a task assignment, and generating an output indicating dispatch coordinates, the dispatch coordinates identifying a dispatch location from which to dispatch, from the mobile hub device, one or more unmanned vehicles to perform a task of the task assignment.

Clause 15 includes the method of clause 14, further comprising estimating, based on the location-specific risk data, a likelihood of a particular type of event occurring within one or more zones of a plurality of zones, wherein the dispatch coordinates are determined further based on the likelihood of the particular type of event occurring within the one or more zones.

Clause 16 includes the method of clause 14 or clause 15, further comprising identifying, based on inventory data of the mobile hub device, one or more unmanned vehicles deployable by the mobile hub device and capable of performing a task of the task assignment.

Clause 17 includes the method of clauses 14 to 16, further comprising determining, based on map data, location data, and the dispatch coordinates, a travel path to move the mobile hub device to the dispatch location based on mobility characteristics of the mobile hub device.

Clause 18 includes the method of clause 17, further comprising moving the mobile hub device to within a threshold distance of the dispatch location.

Clause 19 includes the method of any of clauses 14 to 18, further comprising receiving, at a mobile hub device, deployment location data associated with one or more other mobile hub devices, wherein the dispatch coordinates are determined further based on the deployment location data associated with the one or more other mobile hub devices.

According to clause 20 a hub device for dispatch of unmanned vehicles includes one or more bays for storage of a plurality of unmanned vehicles, one or more network interface devices configured to receive communications including peer location data associated with one or more peer hub devices, a memory storing a vehicle selection model, inventory data, and map data, the map data representing a particular geographic region that includes a location of the hub device and locations of the one or more peer hub devices, the inventory data identifying the plurality of unmanned vehicles and including information indicative of capabilities of each of the plurality of unmanned vehicles, and a processor configured to execute the vehicle selection model to assign one or more unmanned vehicles of the plurality of unmanned vehicles to perform a task of a task assignment, wherein the vehicle selection model selects the assigned one or more unmanned vehicles based on the task assignment, location data indicating the location of the hub device, the peer location data, the map data, and the inventory data.

Clause 21 includes the hub device of clause 20, wherein the memory is integrated into one or more unmanned vehicles of the plurality of unmanned vehicles.

Clause 22 includes the hub device of clause 20 or clause 21, wherein the plurality of unmanned vehicles includes an unmanned aerial vehicle (UAV), an unmanned combat aerial vehicle (UCAV), an unmanned ground vehicle (UGV), an unmanned water vehicle (UWV), an unmanned hybrid vehicle (UHV), or combinations thereof.

Clause 23 includes the hub device of any of clauses 20 to 22, further comprising a location sensor to provide, to the processor, location data indicating the location of the hub device and a propulsion system responsive to the processor, the propulsion system configured to move the hub device to a dispatch location.

Clause 24 includes the hub device any of clauses 20 to 23, wherein the memory further stores a mission planning model executable by the processor to generate the task assignment based on location-specific risk data associated with the particular geographic region.

Clause 25 includes the hub device of clause 24, wherein the mission planning model includes a trained machine learning model.

Clause 26 includes the hub device of clause 24 or clause 25, wherein the mission planning model is further configured to generate one or more task route plans, each task route plan indicating a possible route that an unmanned vehicle could follow to perform the task, the mission planning model further configured to generate a set of estimated capabilities of the unmanned vehicle to be able to perform the task, to be recoverable after performance of the task, or both, and wherein the vehicle selection model selects the one or more vehicles based in part on the set of estimated capabilities.

Clause 27 includes the hub device of any clauses 24 to 26, wherein the one or more network interface devices are further configured to receive a sensor data stream from monitoring devices in the particular geographic region and wherein the memory further stores a risk assessment model configured to generate the location-specific risk data based on the sensor data stream.

Clause 28 includes the hub device of clause 27, wherein the risk assessment model includes a trained machine learning model.

Clause 29 includes the hub device of clause 27 or clause 28, wherein the monitoring devices include the one or more peer hub devices, an unmanned vehicle dispatched by the one or more peer hub devices, an unmanned vehicle dispatched by the hub device, an infrastructure monitoring device, or a combination thereof.

Clause 30 includes the hub device of any of clauses 20 to 29, wherein the vehicle selection model selects a particular unmanned vehicle based at least in part on a cost-benefit analysis considering a priority assigned to the task, a likelihood of the particular unmanned vehicle accomplishing the task, and a likelihood of retrieval of the particular unmanned vehicle.

Clause 31 includes the hub device of clause 30, wherein the processor is configured to perform the cost-benefit analysis using includes a trained machine learning model.

Clause 32 includes the hub device of any of clauses 20 to 31, wherein the information indicative of the capabilities each of the plurality of unmanned vehicles includes an equipment configuration of each of the plurality of unmanned vehicles, a readiness value for each of the plurality of unmanned vehicles, or both.

Clause 33 includes the hub device of clause 32, wherein the readiness value of a particular unmanned vehicle is based on a battery charge state of the particular unmanned vehicle, a fault status indicating in a vehicle health log, or both.

Clause 34 includes the hub device of any of clauses 20 to 33, wherein the vehicle selection model includes a trained machine learning model.

Clause 35 includes the hub device of any of clauses 20 to 34, wherein the processor is further configured to provide instructions related to performance of the task to the selected one or more unmanned vehicles and dispatch the selected one or more unmanned vehicles.

According to clause 36 a method includes receiving, at a hub device, communications including peer location data associated with one or more peer hub devices, and assigning one or more unmanned vehicles stored in one or more bays of the hub device, to perform a task, assignment of the one or more unmanned vehicles based on a task assignment associated with the hub device, location data indicating a location of the hub device, the peer location data, map data, and inventory data identifying the one or more unmanned vehicles and indicating of capabilities of each of the one or more unmanned vehicles.

Clause 37 includes the method of clause 36, wherein the task assignment is based on location-specific risk data associated with a geographic region that include the location of the hub device.

Clause 38 includes the method of clause 37, further comprising generating, at the hub device, the location-specific risk data based on a sensor data stream.

Clause 39 includes the method of any of clauses 36 to 38, further comprising performing a cost-benefit analysis considering a priority assigned to the task, a likelihood of a particular unmanned vehicle accomplishing the task, and a likelihood of retrieval of the particular unmanned vehicle, wherein the task is assigned further based on cost-benefit analysis.

Clause 40 includes the method of any of clauses 36 to 39, further comprising determining a dispatch location and moving the hub device to the dispatch location.

Clause 41 includes the method of any of clauses 36 to 40, further comprising proving instructions related to performance of the task to the selected one or more unmanned vehicles and dispatching the selected one or more unmanned vehicles.

According to clause 42 an unmanned vehicle includes one or more sensors to generate sensor data associated with a status of the unmanned vehicle, one or more network interface devices configured to receive communications including status information associated with one or more peer unmanned vehicles, a memory storing a decision model, and a processor configured to execute the decision model based on the sensor data and the status information and to generate an output designating a coordination and control vehicle from among a group of unmanned vehicles including the one or more peer unmanned vehicles and the unmanned vehicle.

Clause 43 includes the unmanned vehicle of clause 42, wherein the communications are received over an ad hoc mesh network associated with the group of unmanned vehicles.

Clause 44 includes the unmanned vehicle of clause 42 or clause 43, wherein the processor is further configured to control operations of the unmanned vehicle responsive to instructions from the coordination and control vehicle.

Clause 45 includes the unmanned vehicle of any of clauses 42 to 44, wherein the memory further stores a command and control model that is executable by the processor responsive to the unmanned vehicle being designated the coordination and control vehicle.

Clause 46 includes the unmanned vehicle of clause 45, wherein command and control model includes a trained machine learning model.

Clause 47 includes the unmanned vehicle of clause 45 or clause 46, wherein the command and control model is executable to assign tasks to vehicles of the group of unmanned vehicles based on a group task assignment.

Clause 48 includes the unmanned vehicle of clause 47, wherein the tasks are assigned based at least in part on the status information.

Clause 49 includes the unmanned vehicle of any of clauses 45 to 48, wherein the one or more network interface devices are further configured to, based on the unmanned vehicle being designated the coordination and control vehicle, receive a task assignment from a remote command device that is distinct from the group of unmanned vehicles and to transmit, to a particular peer unmanned vehicle of the group of unmanned vehicles, task data identifying a task to be performed by the particular peer unmanned vehicle, the task data determined by the processor executing the command and control model based on the task assignment and the status information.

Clause 50 includes the unmanned vehicle of any of clauses 42 to 49, wherein the one or more network interface devices are further configured to, based on the unmanned vehicle being designated the coordination and control vehicle, generate aggregate status information based on the status information and to transmit aggregate status information to a remote command device that is distinct from the group of unmanned vehicles.

Clause 51 includes the unmanned vehicle of clause 50, wherein the group of unmanned vehicles are assigned to a zone of a geographic area by the remote command device, and wherein the coordination and control vehicle is a dynamically, peer selected lead vehicle of the group of unmanned vehicles.

Clause 52 includes the unmanned vehicle of any of clauses 42 to 51, wherein the status information includes intrinsic data associated with each peer unmanned vehicle, the intrinsic data including load out, health, charge, capabilities, equipment configuration, or a combination thereof.

Clause 53 includes the unmanned vehicle of any of clauses 42 to 52, wherein the status information includes extrinsic data associated with each peer unmanned vehicle, the extrinsic data including location, status of prior assigned tasks, ambient environmental conditions, or a combination thereof.

According to clause 54 a method includes determining, at an unmanned vehicle, that a coordination and control vehicle for a group of unmanned vehicles is to be designated, the group of unmanned vehicles including the unmanned vehicle and one or more peer unmanned vehicles, receiving, at an unmanned vehicle, communications including status information associated with the one or more peer unmanned vehicles, and generating an output designating the coordination and control vehicle from among the group of unmanned vehicles.

Clause 55 includes the method of clause 54, further comprising, responsive to determining that the unmanned vehicle is not designated the coordination and control vehicle, controlling operations of the unmanned vehicle responsive to instructions from the coordination and control vehicle.

Clause 56 includes the method of any of clauses 54 to 55, further comprising, responsive to determining that the unmanned vehicle is designated the coordination and control vehicle, receiving a task assignment from a remote command device that is distinct from the group of unmanned vehicles.

Clause 57 includes the method of clause 56, further comprising assigning tasks to unmanned vehicles of the group of unmanned vehicles based on a group task assignment.

Clause 58 includes the method of clause 57, wherein assigning tasks to unmanned vehicles of the group of unmanned vehicles includes determining task data identifying a task to be performed by a particular peer unmanned vehicle and transmitting the task data to the particular peer unmanned vehicle.

Clause 59 includes the method of any of clauses 54 to 58, further comprising, responsive to determining that the unmanned vehicle is designated the coordination and control vehicle, generating aggregate status information based on the status information, and transmitting the aggregate status information to a remote command device that is distinct from the group of unmanned vehicles.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A mobile hub device for dispatch of unmanned vehicles, the mobile hub device comprising:
    a location sensor to generate location data indicating a location of the mobile hub device;
    one or more bays for storage of a plurality of unmanned vehicles;
    one or more network interface devices configured to receive communications including location-specific risk data and a task assignment;
    a memory storing a decision model and map data, the map data representing a particular geographic region that includes the location of the mobile hub device; and
    a processor configured to execute the decision model based on the task assignment, the location-specific risk data, the map data, and the location data and to generate an output indicating dispatch coordinates, the dispatch coordinates identifying a dispatch location from which to dispatch one or more unmanned vehicles of the plurality of unmanned vehicles to perform a task indicated by the task assignment.

2. The mobile hub device of claim 1, wherein the memory is integrated into one or more unmanned vehicles of the plurality of unmanned vehicles.

3. The mobile hub device of claim 1, wherein the plurality of unmanned vehicles include an unmanned aerial vehicle (UAV), an unmanned combat aerial vehicle (UCAV), an unmanned ground vehicle (UGV), an unmanned water vehicle (UWV), an unmanned hybrid vehicle (UHV), or combinations thereof.

4. The mobile hub device of claim 1, further comprising a propulsion system responsive to the processor, the propulsion system configured to move the mobile hub device to within a threshold distance of the dispatch location.

5. The mobile hub device of claim 4, wherein the threshold distance is determined based on an operational capability of the one or more unmanned vehicles and locations of other mobile hub devices.

6. The mobile hub device of claim 1, wherein the processor is further configured to determine, based on the map data, the location data, and the dispatch coordinates, a travel path to move the mobile hub device to the dispatch location based on mobility characteristics of the mobile hub device.

7. The mobile hub device of claim 1, wherein the location-specific risk data indicates an estimated likelihood of a particular type of event occurring within a target geographic region.

8. The mobile hub device of claim 1, wherein the processor is configured to determine the dispatch coordinates in response to determining that the one or more unmanned vehicles are incapable of performing the task.

9. The mobile hub device of claim 1, wherein the memory further stores inventory data indicating an equipment configuration of each of the plurality of unmanned vehicles, wherein the processor is further configured to select the one or more unmanned vehicles to dispatch at the dispatch location based on the task assignment and the inventory data.

10. The mobile hub device of claim 1, wherein the location-specific risk data includes real-time or near real-time status data for each of a plurality of zones within the particular geographic region, the memory further storing a risk model that is executable by the processor to estimate, based on the location-specific risk data, a likelihood of a particular type of event occurring within one or more zones of the plurality of zones.

11. The mobile hub device of claim 10, wherein the risk model includes a trained machine learning model.

12. The mobile hub device of claim 1, wherein the decision model includes a trained machine learning model.

13. The mobile hub device of claim 1, wherein the one or more network interface devices are further configured to receive deployment location data associated with one or more other mobile hub devices, and the processor is configured to determine the dispatch coordinates further based on the deployment location data.

14. The mobile hub device of claim 1, wherein the memory further stores a vehicle selection model and inventory data, the inventory data identifying the plurality of unmanned vehicles and including information indicative of capabilities of each of the plurality of unmanned vehicles, wherein the vehicle selection model is executable by the processor to assign one or more unmanned vehicles of the plurality of unmanned vehicles to perform the task, wherein the vehicle selection model selects the assigned one or more unmanned vehicles based on the task assignment, the location data, and the inventory data.

15. A method comprising:
   receiving, at a mobile hub device, communications including location-specific risk data and a task assignment;
   generating an output indicating dispatch coordinates, the dispatch coordinates identifying a dispatch location from which to dispatch, from the mobile hub device, one or more unmanned vehicles to perform a task of the task assignment; and
   moving the mobile hub device to within a threshold distance of the dispatch location.

16. The method of claim 15, further comprising estimating, based on the location-specific risk data, a likelihood of a particular type of event occurring within one or more zones of a plurality of zones, wherein the dispatch coordinates are determined further based on the likelihood of the particular type of event occurring within the one or more zones.

17. The method of claim 15, further comprising identifying, based on inventory data of the mobile hub device, the one or more unmanned vehicles deployable by the mobile hub device and capable of performing the task of the task assignment.

18. The method of claim 15, further comprising determining, based on map data, location data, and the dispatch coordinates, a travel path to move the mobile hub device to the dispatch location based on mobility characteristics of the mobile hub device.

19. The method of claim 15, further comprising receiving, at the mobile hub device, deployment location data associated with one or more other mobile hub devices, wherein the dispatch coordinates are determined further based on the deployment location data associated with the one or more other mobile hub devices.

20. The method of claim 15, wherein the location-specific risk data includes real-time or near real-time status data for each of a plurality of zones within a particular geographic region, the method further comprising storing a risk model that is executable by a processor to estimate, based on the location-specific risk data, a likelihood of a particular type of event occurring within one or more zones of the plurality of zones.

* * * * *